(12) United States Patent
Liu

(10) Patent No.: US 10,785,002 B2
(45) Date of Patent: Sep. 22, 2020

(54) REFERENCE SIGNAL TRANSMITTING METHOD, REFERENCE SIGNAL RECEIVING METHOD, APPARATUS, AND SYSTEM

(71) Applicant: Huawei Technologies Co., Ltd., Shenzhen, Guangdong (CN)

(72) Inventor: Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/146,013

(22) Filed: Sep. 28, 2018

(65) Prior Publication Data

US 2019/0036664 A1 Jan. 31, 2019

Related U.S. Application Data

(63) Continuation of application No. PCT/CN2016/078228, filed on Mar. 31, 2016.

(51) Int. Cl.
*H04W 4/00* (2018.01)
*H04L 5/00* (2006.01)
(Continued)

(52) U.S. Cl.
CPC ......... *H04L 5/0048* (2013.01); *H04B 7/0413* (2013.01); *H04B 7/0684* (2013.01);
(Continued)

(58) Field of Classification Search
CPC ..... H04L 5/0048; H04L 5/0023; H04L 5/005; H04L 5/0094
See application file for complete search history.

(56) References Cited

U.S. PATENT DOCUMENTS

| | | |
|---|---|---|
| 2012/0033643 A1 | 2/2012 | Noh et al. |
| 2012/0182956 A1 | 7/2012 | Liu et al. |
| (Continued) | | |

FOREIGN PATENT DOCUMENTS

| | | |
|---|---|---|
| CN | 101777945 A | 7/2010 |
| CN | 104081872 B | 1/2018 |
| (Continued) | | |

OTHER PUBLICATIONS

Huawei, HiSilicon, "CSI-RS design for 12 and 16 ports," R1-153792, 3GPP TSG RAN WG1 Meeting #82, Beijing, China, Aug. 24-28, 2015, 5 pages.
(Continued)

*Primary Examiner* — Abdelnabi O Musa
(74) *Attorney, Agent, or Firm* — Fish & Richardson P.C.

(57) ABSTRACT

Embodiments of the present disclosure relate to the communications field, and provide a reference signal transmitting/receiving method and system, and an apparatus. The method includes: determining, by a transmitting device, a first resource map of a reference signal supporting Z antenna ports, and transmitting the reference signal after the reference signal supporting Z antenna ports is mapped to a target time-frequency resource based on the first resource map, where the first resource map is repeated in time domain and/or frequency domain in a repetition unit of K resource units, each of the K resource units corresponds to a second resource map of a reference signal supporting P antenna ports, and the P antenna ports corresponding to the second resource map for every two adjacent resource units include G same antenna ports and H different antenna ports.

20 Claims, 18 Drawing Sheets

(51) Int. Cl.
*H04B 7/06* (2006.01)
*H04B 7/0413* (2017.01)

(52) U.S. Cl.
CPC ............ *H04L 5/005* (2013.01); *H04L 5/0023* (2013.01); *H04L 5/0094* (2013.01); *H04L 5/0007* (2013.01)

(56) References Cited

U.S. PATENT DOCUMENTS

| | | |
|---|---|---|
| 2013/0003628 A1 | 1/2013 | Christin et al. |
| 2013/0343302 A1 | 12/2013 | Kim et al. |
| 2014/0321399 A1 | 10/2014 | Liu et al. |
| 2016/0242060 A1 | 8/2016 | Kakishima et al. |
| 2016/0373231 A1* | 12/2016 | Yoon ................... H04L 5/0023 |
| 2017/0245271 A1* | 8/2017 | Lee ....................... H04B 7/06 |
| 2017/0288835 A1* | 10/2017 | Kim ..................... H04L 5/0048 |
| 2018/0115919 A1* | 4/2018 | Kakishima ............ H04W 16/28 |

FOREIGN PATENT DOCUMENTS

| | | |
|---|---|---|
| JP | 2013511182 A | 3/2013 |
| JP | 2015508603 A | 3/2015 |
| KR | 10-2011-0117032 A | 10/2011 |
| WO | 2014168438 A1 | 10/2014 |
| WO | 2014193070 A1 | 12/2014 |
| WO | 2015045696 A1 | 4/2015 |

OTHER PUBLICATIONS

Office Action issued in Japanese Application No. 2018-551139 dated Sep. 24, 2019, 12 pages (with English translation).
Office Action issued in Chinese Application No. 201680083822.8 dated Mar. 2, 2020, 5 pages.

* cited by examiner

REFERENCE SIGNAL TRANSMITTING METHOD, REFERENCE SIGNAL RECEIVING METHOD, APPARATUS, AND SYSTEM

CROSS-REFERENCE TO RELATED APPLICATIONS

This application is a continuation of International Application No. PCT/CN2016/078228, filed on Mar. 31, 2016, the disclosure of which is hereby incorporated by reference in its entirety.

TECHNICAL FIELD

Embodiments of the present disclosure relate to the communications field, and in particular, to a reference signal transmitting method, a reference signal receiving method, an apparatus, and a system.

BACKGROUND

In a mobile communications system, there are different types of reference signals, for example, a reference signal used for channel estimation and a reference signal used for channel state measurement.

In Release 8 (R8) of a Long Term Evolution (LTE) system, a cell-specific reference signal CRS) is a reference signal used for channel estimation and supports transmission on a maximum of four antenna ports in each resource unit, and the resource unit may be a physical resource block (PRB). In LTE R10, a demodulation reference signal DMRS) is a reference signal used for channel estimation, and supports transmission on a maximum of eight antenna ports in each resource unit. A channel state information-reference signal (CSI-RS) is a reference signal used for channel state measurement, and supports transmission on a maximum of eight antenna ports in each resource unit. In LTE R12, a CSI-RS supports transmission on a maximum of 16 antenna ports in each resource unit.

The foregoing reference signals support different maximum quantities of antenna ports in the LTE system, but support transmission on a maximum of 16 antenna ports. In a subsequent release of LTE, for example, in R13, the reference signal needs to support more antenna ports to obtain better multiple-input multiple-output (MIMO) performance. However, if a current reference signal transmitting method is used for transmitting a reference signal, when a quantity of the antenna ports is increased to 20, 24, 28, or 32, reference signals need to occupy a large quantity of radio resources in each resource unit. This increases resource overheads of the mobile communications system.

SUMMARY

To resolve a problem in which resource overheads of a mobile communications system increase because reference signals need to occupy a large quantity of radio resources in each resource unit when a quantity of antenna ports is increased to 20, 24, 28, or 32 if a current reference signal transmitting method is used for transmitting a reference signal, embodiments of the present disclosure provide a reference signal transmitting method, a reference signal receiving method, an apparatus, and a system. The technical solutions are as follows:

According to a first aspect, the present disclosure provides a reference signal transmitting method, and the method includes: determining, by a transmitting device, a first resource map of a reference signal supporting Z antenna ports, where the first resource map includes a location at which the reference signal supporting Z antenna ports is mapped to a time-frequency resource; and transmitting, by the transmitting device, the reference signal after the reference signal supporting Z antenna ports is mapped to a target time-frequency resource based on the first resource map, where the first resource map is repeated in time domain and/or frequency domain in a repetition unit of K resource units, the K resource units are K consecutive resource units in time domain or K consecutive resource units in frequency domain in a reference signal resource set, a time-frequency resource that is used to transmit the reference signal is configured for the reference signal resource set, each of the K resource units is corresponding to a second resource map of a reference signal supporting P antenna ports, the P antenna ports corresponding to the second resource map for every two adjacent resource units include G same antenna ports and H different antenna ports, the P antenna ports are a subset of the Z antenna ports corresponding to the first resource map, and P<Z.

According to the reference signal transmitting method provided in the present disclosure, the transmitting device determines the first resource map of the reference signal supporting Z antenna ports, and transmits the reference signal after the reference signal supporting Z antenna ports is mapped to the target time-frequency resource based on the first resource map. Because the first resource map is repeated in time domain and/or frequency domain in the repetition unit of K resource units, each of the K resource units is corresponding to the second resource map of the reference signal supporting P antenna ports, and the P antenna ports corresponding to the second resource map for every two adjacent resource units include G same antenna ports and H different antenna ports, partial repetition of antenna ports in different resource units helps reduce a quantity of time-frequency resources occupied by reference signals in each resource unit and ensure a transmission density of the reference signals.

In a first possible implementation of the first aspect, the Z antenna ports include M groups of antenna ports, each group includes Y antenna ports, and Z=M*Y; and the second resource map is obtained by aggregating N third resource maps, each third resource map is corresponding to one group of antenna ports in the M groups of antenna ports, P=N*Y, G=A*Y, H=B*Y, and A+B=N, where Y is a power of 2.

With reference to the first possible implementation of the first aspect, in a second possible implementation of the first aspect, any two second resource maps in the K resource units occupy a same time domain location in a time-frequency resource pattern corresponding to a single resource unit; and at least two second resource maps in the K resource units occupy different frequency domain locations in a time-frequency resource pattern corresponding to a single resource unit, and/or at least two second resource maps in the K resource units occupy a same frequency domain location in a time-frequency resource pattern corresponding to a single resource unit.

With reference to the first possible implementation of the first aspect or the second possible implementation of the first aspect, in a third possible implementation of the first aspect, in the K resource units, a $j^{th}$ third resource map in an $i^{th}$ resource unit and a $j^{th}$ third resource map in an (i+1) resource unit occupy a same time domain location in a time-frequency resource pattern corresponding to a single resource unit; and the $j^{th}$ third resource map in the $i^{th}$ resource unit is corresponding to one group of antenna ports in the M groups of antenna ports, and the $j^{th}$ third resource map in the $(i+1)^{th}$ resource unit is corresponding to another group of antenna ports in the M groups of antenna ports, where $0 \le i \le K-1$ and $0 \le j \le N-1$.

With reference to the first possible implementation of the first aspect or the second possible implementation of the first aspect, in a fourth possible implementation of the first aspect, the K resource units occupy a same time domain resource in the reference signal resource set, and the K resource units are consecutive in frequency domain of the reference signal resource set; a $j^{th}$ third resource map in each of the K resource units occupies a same time domain location in a single resource unit, and M $j^{th}$ third resource maps in M resource units are in a one-to-one correspondence to the M groups of antenna ports; a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $0 \le j < j+1 \le N-1$.

With reference to the first possible implementation of the first aspect or the second possible implementation of the first aspect, in a fifth possible implementation of the first aspect, the K resource units occupy a same frequency domain resource in the reference signal resource set, and the K resource units are consecutive in time domain of the reference signal resource set; a $j^{th}$ third resource map in each of the K resource units occupies a same time domain location in a single resource unit, and $j^{th}$ third resource maps in M resource units are in a one-to-one correspondence to the M groups of antenna ports; a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $0 \le j < j+1 \le N-1$.

With reference to any one of the first aspect, the first possible implementation of the first aspect, the second possible implementation of the first aspect, or the third possible implementation of the first aspect, in a sixth possible implementation of the first aspect, the K resource units occupy a same frequency domain resource in the reference signal resource set, and the K resource units are consecutive in time domain of the reference signal resource set.

With reference to any one of the first aspect, the first possible implementation of the first aspect, the second possible implementation of the first aspect, or the third possible implementation of the first aspect, in a seventh possible implementation of the first aspect, the K resource units occupy a same time domain resource in the reference signal resource set, and the K resource units are consecutive in frequency domain of the reference signal resource set.

With reference to any one of the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation of the first aspect, the resource unit is a PRB, or the resource unit is a PRB pair.

With reference to any one of the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in a ninth possible implementation of the first aspect, the reference signal is a DMRS, a CSI-RS, or a CRS.

With reference to any one of the second possible implementation of the first aspect, the third possible implementation of the first aspect, the fourth possible implementation of the first aspect, or the fifth possible implementation of the first aspect, in a tenth possible implementation of the first aspect, numbers of antenna ports in each of the M groups are consecutive, and a number $p^{(m)}$ of an antenna port in an $m^{th}$ group is: $p^{(m)}=[m*Y+\alpha, (m+1)*Y-1+\alpha]$, where $0 \le m \le M-1$, and $\alpha$ is a predetermined offset.

With reference to any one of the second possible implementation of the first aspect, the third possible implementation of the first aspect, the fourth possible implementation of the first aspect, or the fifth possible implementation of the first aspect, in an eleventh possible implementation of the first aspect, some of numbers of antenna ports in each of the M groups are consecutive, and a number $p^{(m)}$ of an antenna port in an $m^{th}$ group is:

$$p^{(m)} = \begin{cases} p' + \frac{Y}{2}m + \alpha, & p' = 0, 1, 2, \ldots, \frac{Y}{2} - 1; \\ p' + \frac{Y}{2}(m+M-1) + \alpha, & p' = \frac{Y}{2}, \frac{Y}{2}+1, \frac{Y}{2}+2, \ldots, Y-1; \end{cases}$$

where
$0 \le m \le M-1$, and $\alpha$ is a predetermined offset.

With reference to any one of the second possible implementation of the first aspect, the third possible implementation of the first aspect, the fourth possible implementation of the first aspect, or the fifth possible implementation of the first aspect, in a twelfth possible implementation of the first aspect, the N third resource maps in each resource unit occupy three pairs, two pairs, or one pair of OFDM symbols.

With reference to any one of the second possible implementation of the first aspect, the third possible implementation of the first aspect, the fourth possible implementation of the first aspect, or the fifth possible implementation of the first aspect, in a thirteenth possible implementation of the first aspect, the reference signal is a CSI-RS, the resource unit is a physical resource block pair PRB pair, Y=8, and N=3;

the three third resource maps in each resource unit occupy time-frequency resources indicated by a CSI-RS configuration 0, a CSI-RS configuration 1, and a CSI-RS configuration 2 in five CSI-RS configurations; or the three third resource maps in each resource unit occupy time-frequency resources indicated by a CSI-RS configuration 0, a CSI-RS configuration 2, and a CSI-RS configuration 3 in five CSI-RS configurations; or the three third resource maps in each resource unit occupy time-frequency resources indicated by a CSI-RS configuration 0, a CSI-RS configuration 2, and a CSI-RS configuration 4 in five CSI-RS configurations; or the three third resource maps in each resource unit occupy time-frequency resources indicated by a CSI-RS configuration 1, a CSI-RS configuration 3, and a CSI-RS configuration 4 in five CSI-RS configurations; and the five CSI-RS configurations include:

a time-frequency resource indicated by the CSI-RS configuration 0 includes eight resource elements REs: (k, l)=(9, 5), (9, 6), (8, 5), (8, 6), (3, 5), (3, 6), (2, 5), (2, 6);

a time-frequency resource indicated by the CSI-RS configuration 1 includes eight resource elements REs: (k, l)=(9, 9), (9, 10), (8, 9), (8, 10), (3, 9), (3, 10), (2, 9), (2, 10);

a time-frequency resource indicated by the CSI-RS configuration 2 includes eight resource elements REs: (k, l)=(9, 12), (9, 13), (8, 12), (8, 13), (3, 12), (3, 13), (2, 12), (2, 13);

a time-frequency resource indicated by the CSI-RS configuration 3 includes eight resource elements REs: (k, l)= (11, 9), (11, 10), (10, 9), (10, 10), (5, 9), (5, 10), (4, 9), (4, 10); and a time-frequency resource indicated by the CSI-RS configuration 4 includes eight resource elements REs: (k, l)=(7, 9), (7, 10), (6, 9), (6, 10), (1, 9), (1, 10), (0, 9), (0, 10), where k is a subcarrier number in the PRB pair, and l is an orthogonal frequency division multiplexing OFDM symbol number in the PRB pair.

With reference to the thirteenth possible implementation of the first aspect, in a fourteenth possible implementation of the first aspect, spectrum spreading is performed, by using spreading code of orthogonal cover code OCC=8, on eight channel state information-reference signals CSI-RSs corresponding to each third resource map.

With reference to any one of the second possible implementation of the first aspect, the third possible implementation of the first aspect, the fourth possible implementation of the first aspect, or the fifth possible implementation of the first aspect, in a fifteenth possible implementation of the first aspect, N groups of antenna ports corresponding to a second resource map of a $k^{th}$ resource unit are a $((k \bmod M)+\beta)^{th}$ group of antenna ports, a $(((k+1) \bmod M)+\beta)^{th}$ group of antenna ports, ..., and a $(((k+N-1) \bmod M)+\beta)^{th}$ group of antenna ports in the M groups of antenna ports, where $0 \leq k \leq K-1$, and $\beta$ is a predetermined offset.

With reference to any one of the second possible implementation of the first aspect, the third possible implementation of the first aspect, the fourth possible implementation of the first aspect, or the fifth possible implementation of the first aspect, in a sixteenth possible implementation of the first aspect, when Z=20, M=10, Y=2, and 1<N<10, or M=5, Y=4, and 1<N<5; or when Z=24, M=12, Y=2, and 1<N<12, or M=6, Y=4, and 1<N<6, or M=3, Y=8, and 1<N<3; or when Z=28, M=14, Y=2, and 1<N<14, or M=7, Y=4, and 1<N<7; or when Z=32, M=16, Y=2, and 1<N<16, or M=8, Y=4, and 1<N<8, or M=4, Y=8, and 1<N<4.

According to a second aspect, the present disclosure provides a reference signal receiving method, and the method includes: determining, by a receiving device, a first resource map of a reference signal supporting Z antenna ports, where the first resource map includes a location at which the reference signal supporting Z antenna ports is mapped to a time-frequency resource; and receiving, by the receiving device based on the first resource map, the reference signal supporting Z antenna ports from a target time-frequency resource, where the first resource map is repeated in time domain and/or frequency domain in a repetition unit of K resource units, the K resource units are K consecutive resource units in time domain or K consecutive resource units in frequency domain in a reference signal resource set, a time-frequency resource that is used to transmit the reference signal is configured for the reference signal resource set, each of the K resource units is corresponding to a second resource map of a reference signal supporting P antenna ports, the P antenna ports corresponding to the second resource map for every two adjacent resource units include G same antenna ports and H different antenna ports, the P antenna ports are a subset of the Z antenna ports corresponding to the first resource map, and P<Z.

According to the reference signal transmitting method provided in the present disclosure, the receiving device determines the first resource map of the reference signal supporting Z antenna ports, and receives, based on the first resource map, the reference signal supporting Z antenna ports from the target time-frequency resource. Because the first resource map is repeated in time domain and/or frequency domain in the repetition unit of K resource units, each of the K resource units is corresponding to the second resource map of the reference signal supporting P antenna ports, and the P antenna ports corresponding to the second resource map for every two adjacent resource units include G same antenna ports and H different antenna ports, partial repetition of antenna ports in different resource units helps reduce a quantity of time-frequency resources occupied by reference signals in each resource unit and ensure a transmission density of the reference signals.

For various possible implementations of the second aspect, refer to various possible implementations of the first aspect.

According to a third aspect, the present disclosure provides a transmitting apparatus, the transmitting apparatus includes at least one unit, and the at least one unit is configured to implement the reference signal transmitting method according to any one of the first aspect or the possible implementations of the first aspect.

According to a fourth aspect, the present disclosure provides a receiving apparatus, the receiving apparatus includes at least one unit, and the at least one unit is configured to implement the reference signal receiving method according to any one of the second aspect or the possible implementations of the second aspect.

According to a fifth aspect, the present disclosure provides a transmitting device. The transmitting device includes a processor, and a memory and a transmitter that are connected to the processor. The processor is configured to store one or more instructions, the instructions are instructed to be executed by the processor, the processor is configured to implement the reference signal transmitting method according to any one of the first aspect or the possible implementations of the first aspect, and the transmitter is configured to modulate, demodulate, and transmit a reference signal.

According to a sixth aspect, the present disclosure provides a receiving device. The receiving device includes a processor, and a memory and a transmitter that are connected to the processor. The processor is configured to store one or more instructions, the instructions are instructed to be executed by the processor, the processor is configured to implement the reference signal receiving method according to any one of the second aspect or the possible implementations of the second aspect, and the transmitter is configured to modulate, demodulate, and receive a reference signal.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

FIG. 17 is a schematic diagram of implementing a reference signal transmitting/receiving method according to an embodiment of the present disclosure;

DESCRIPTION OF EMBODIMENTS

To make the objectives, technical solutions, and advantages of the present disclosure clearer, the following further describes the implementations of the present disclosure in detail with reference to the accompanying drawings.

A "module" mentioned in this specification is a program or an instruction that is stored in a memory and can implement some functions. A "unit" mentioned in this specification is a functional structure divided based on logic. The "unit" may be implemented by only hardware, or implemented by a combination of software and hardware.

"A plurality of" in this specification means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
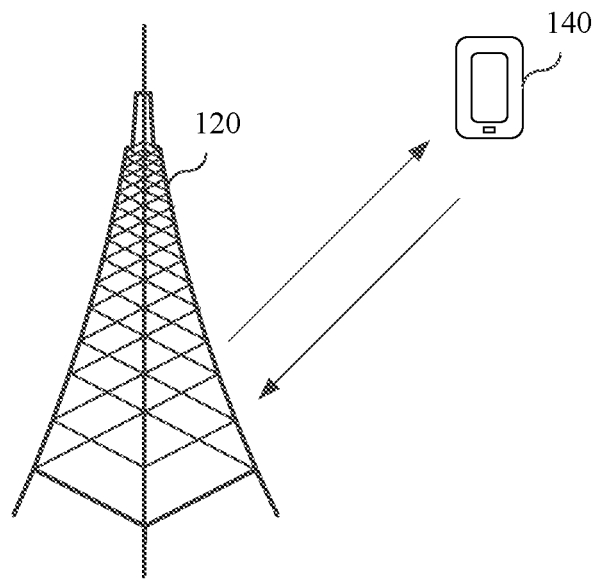
FIG. 1 is a schematic structural diagram of a reference signal transmitting/receiving system according to an embodiment of the present disclosure.

Referring to FIG. 1, FIG. 1 shows a schematic structural diagram of a reference signal transmitting/receiving system according to an example embodiment of the present disclosure. The reference signal transmitting/receiving system includes a transmitting device 120 and a receiving device 140.

The transmitting device 120 has a capability of transmitting a reference signal. Optionally, the transmitting device 120 is an access network device in a mobile communications system. Optionally, the access network device is a base station (BTS, base transceiver station) in Global System for Mobile Communications (GSM) or Code Division Multiple Access (CDMA). Optionally, the access network device is a base station (NodeB) in UMTS. Optionally, the access network device is an evolved NodeB (evolutional Node B, eNB or e-NodeB) in Long Term Evolution (LTE).

The receiving device 140 has a capability of receiving a reference signal. Optionally, the receiving device 140 is a terminal device in a mobile communications system. Optionally, the access device 140 may be a mobile site (Mobile Station), a mobile station (Mobile), a user terminal, a user device, or user equipment (UE), for example, a mobile phone, a tablet computer, or a smart appliance.

Optionally, the transmitting device 120 and the receiving device 140 communicate with each other by using a wireless carrier.

Optionally, the reference signal transmitting/receiving system shown in FIG. 1 may include a plurality of transmitting devices 120 and/or a plurality of receiving devices 140, and one receiving device 140 may communicate with a plurality of transmitting devices 120. Only one transmitting device 120 and one receiving device 140 are shown in FIG. 1 as an example for description. This is not limited in this embodiment.

Figure 2:
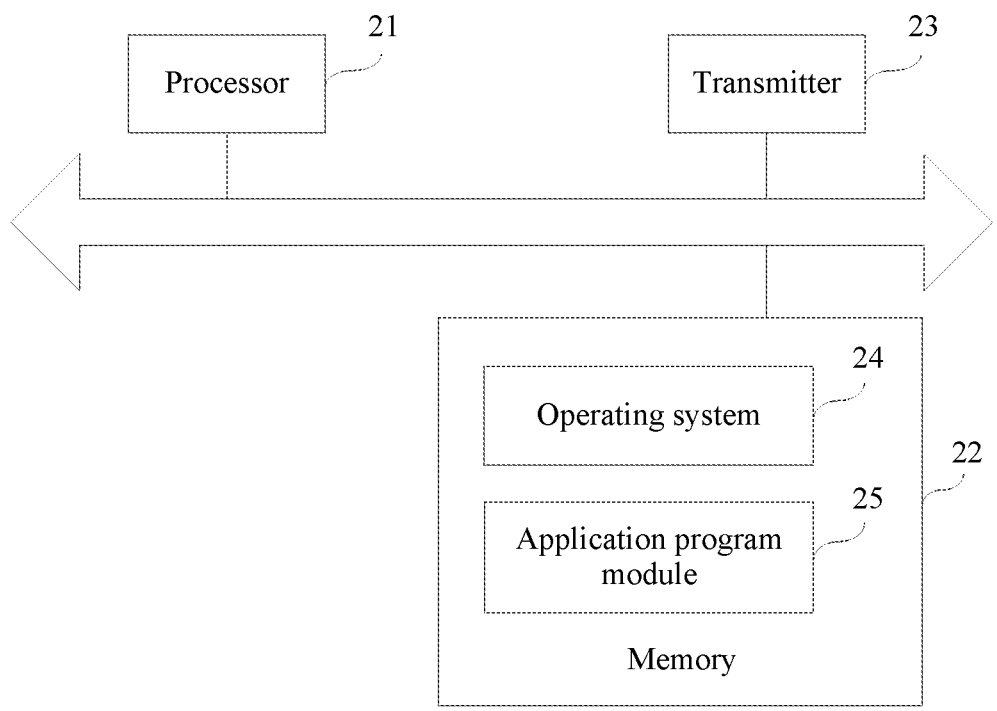
FIG. 2 is a schematic structural diagram of a transmitting device according to an embodiment of the present disclosure.

Referring to FIG. 2, FIG. 2 shows a schematic structural diagram of a transmitting device according to an example embodiment of the present disclosure. The transmitting device includes a processor 21, a memory 22, and a transmitter 23.

The processor 21 is connected to the memory 22.

The processor 21 includes one or more processing cores, and by running a software program and a module, the processor 21 executes various functional applications and processes information.

The memory 22 may be configured to store the software program and the module. The memory 22 may store an operating system 24 and an application program module 25 required by at least one function.

The application program module 25 may include a determining module and a transmitting module. The determining module is configured to determine a first resource map of a reference signal supporting Z antenna ports. The transmitting module is configured to transmit the reference signal after the reference signal supporting Z antenna ports is mapped to a target time-frequency resource based on the first resource map.

In addition, the memory 22 may be implemented by any type of volatile or nonvolatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optic disc.

The transmitter 23 includes a modulation and demodulation module and a Multiple Input Multiple Output (MIMO) antenna. The MIMO antenna is an antenna that supports transmission/reception on a plurality of antenna ports. In this embodiment, the MIMO antenna includes at least two transmit antennas. Optionally, the transmitter 23 is configured to modulate, demodulate, and transmit a reference signal.

The processor 21 transmits, by using the transmitter 23, the reference signal after the reference signal supporting Z antenna ports is mapped to the target time-frequency resource based on the first resource map.

It should be noted that Z is an integer greater than 2.

Persons skilled in the art may understand that, a structure of the transmitting device 120 shown in FIG. 2 does not constitute a limitation on the transmitting device 120, and the transmitting device 120 may include components more or fewer than those shown in the figure, or combine some components, or have different component arrangements.

Figure 3:
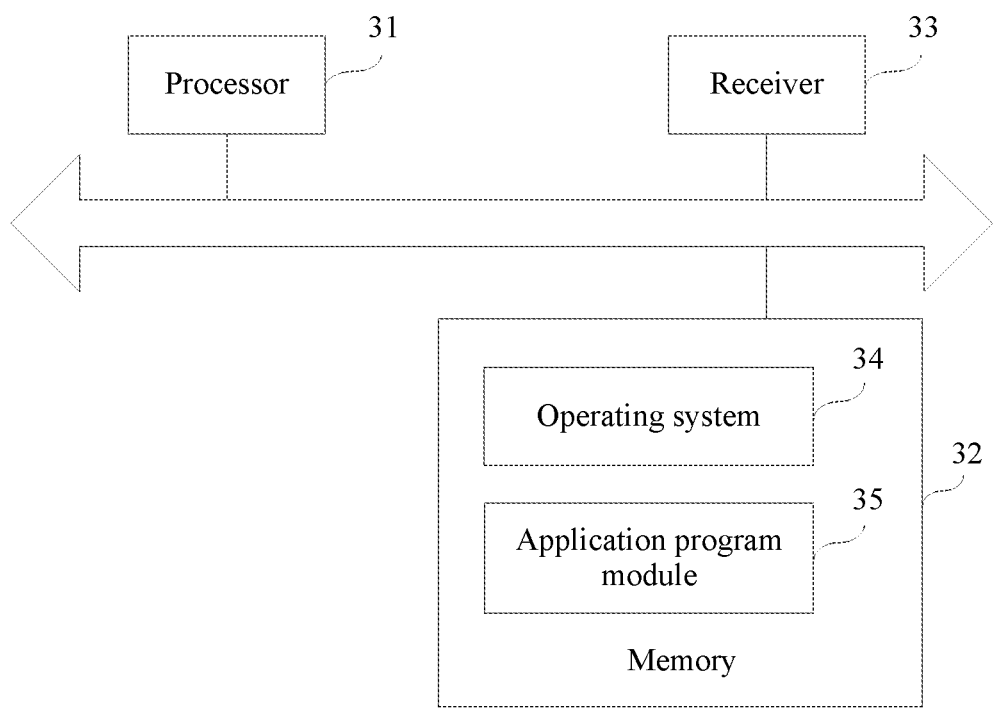
FIG. 3 is a schematic structural diagram of a receiving device according to an embodiment of the present disclosure.

Referring to FIG. 3, FIG. 3 shows a schematic structural diagram of a receiving device 140 according to an example embodiment of the present disclosure. The receiving device 140 includes a processor 31, a memory 32, and a receiver 33.

The processor 31 is connected to the memory 32.

The processor 31 includes one or more processing cores, and by running a software program and a module, the processor 31 executes various functional applications and processes information.

The memory 32 may be configured to store the software program and the module. The memory 32 may further store an operating system 35 and an application program module 36 required by at least one function.

The application program module 36 may include a determining module and a receiving module. The determining module is configured to determine a first resource map of a reference signal supporting Z antenna ports. The receiving unit is configured to receive, based on the first resource map, the reference signal supporting Z antenna ports from a target time-frequency resource.

In addition, the memory 32 may be implemented by any type of volatile or nonvolatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optic disc.

The receiver 33 includes a modulation and demodulation module and a MIMO antenna. The MIMO antenna is an antenna that supports transmission/reception on a plurality of antenna ports. In this embodiment, the MIMO antenna includes at least two receive antennas. Optionally, the receiver 33 is configured to modulate, demodulate, and receive a reference signal.

The receiver 31 receives, based on the first resource map by using the receiver 33, the reference signal supporting Z antenna ports from the target time-frequency resource.

It should be noted that Z is an integer greater than or equal to 4.

Persons skilled in the art may understand that, a structure of the receiving device 140 shown in FIG. 3 does not constitute a limitation on the receiving device 140, and the receiving device 140 may include components more or fewer than those shown in the figure, or combine some components, or have different component arrangements.

Figure 4:
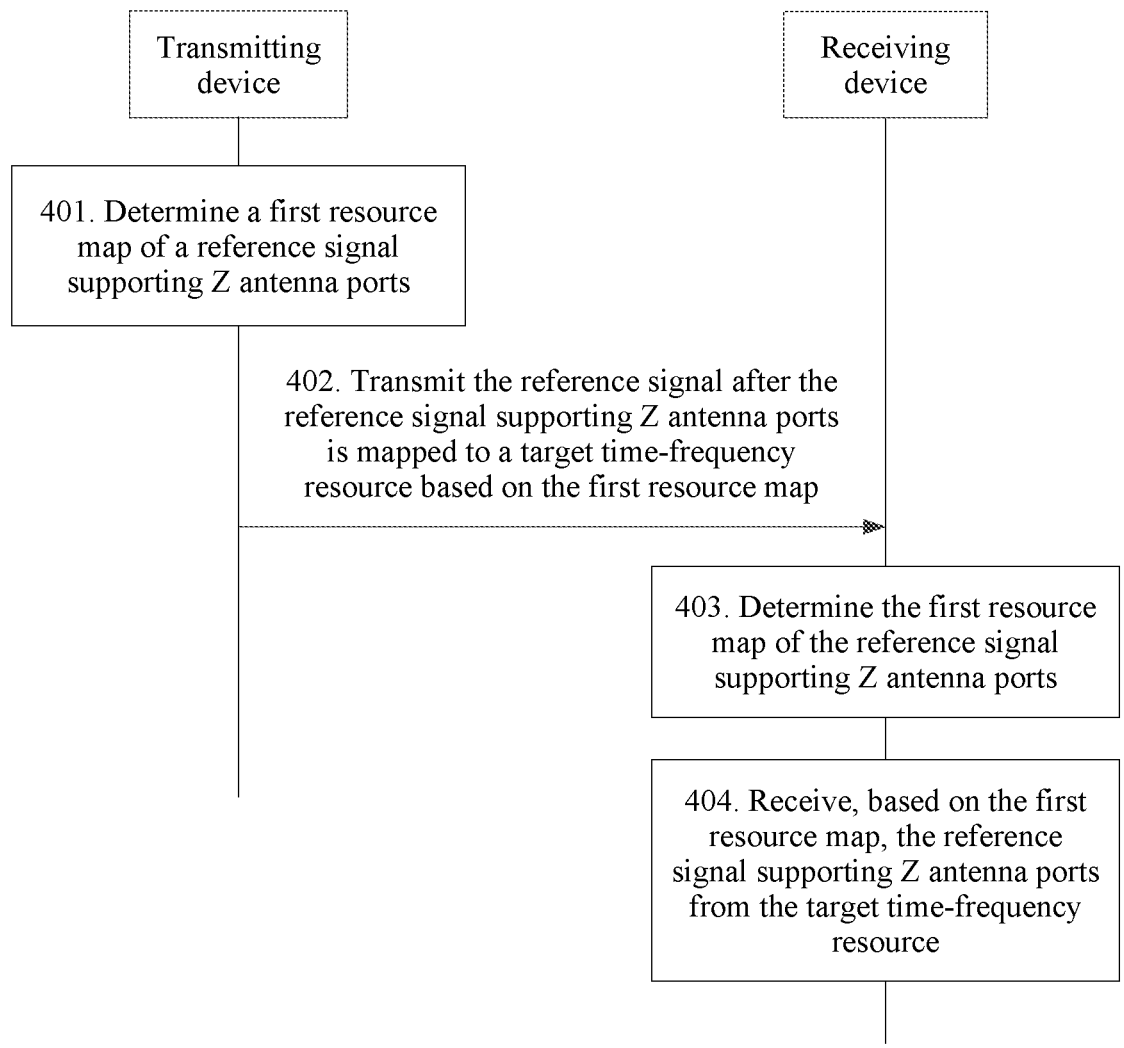
FIG. 4 is a method flowchart of a reference signal transmitting/receiving method according to an embodiment of the present disclosure.

Referring to FIG. 4, FIG. 4 shows a method flowchart of a reference signal transmitting/receiving method according to an example embodiment of the present disclosure. This embodiment is described by using an example in which the reference signal transmitting method is applied to the transmitting device shown in FIG. 1. As shown in FIG. 4, the reference signal transmitting/receiving method includes the following steps.

Step 401: The transmitting device determines a first resource map of a reference signal supporting Z antenna ports.

The first resource map includes a location at which the reference signal supporting Z antenna ports is mapped to a time-frequency resource.

The transmitting device determines, according to a predetermined resource mapping rule, the first resource map of the reference signal supporting Z antenna ports.

Step 402: The transmitting device transmits the reference signal after the reference signal supporting Z antenna ports is mapped to a target time-frequency resource based on the first resource map.

The transmitting device maps the reference signal supporting Z antenna ports to the target time-frequency resource based on the first resource map, performs, on the reference signal, some processing steps familiar to persons skilled in the art, such as discretization, time domain preprocessing, Fourier transform (Fast Fourier Transformation, FFT), frequency domain analysis, filtering, or inverse Fourier transform (Inverse Fast Fourier Transformation, IFFT), and transmits the reference signal after processing of the reference signal is completed.

Step 403: A receiving device determines the first resource map of the reference signal supporting Z antenna ports.

The receiving device determines, according to the predetermined resource mapping rule, the first resource map of the reference signal supporting Z antenna ports.

Step 404: The receiving unit receives, based on the first resource map, the reference signal supporting Z antenna ports from the target time-frequency resource.

The first resource map is repeated in time domain and/or frequency domain in a repetition unit of K resource units.

The K resource units are K consecutive resource units in time domain or K consecutive resource units in frequency domain in a reference signal resource set. A time-frequency resource that is used to transmit the reference signal is configured for the reference signal resource set. Each of the K resource units is corresponding to a second resource map of a reference signal supporting P antenna ports. The P antenna ports corresponding to the second resource map for every two adjacent resource units include G same antenna ports and H different antenna ports, the P antenna ports are a subset of the Z antenna ports corresponding to the first resource map, and P<Z.

The P antenna ports are a proper subset of the Z antenna ports corresponding to the first resource map.

It should be noted that Z is an integer greater than or equal to 4, P is an integer greater than 2, K is an integer greater than 2, H is an integer greater than 2, and G is an integer greater than 2.

It should be noted that step 401 and step 402 may be separately implemented as a method embodiment on a transmitting device side, and step 403 and step 404 may be separately implemented as a method embodiment on a receiving device side.

In conclusion, according to the reference signal transmitting/receiving method provided in this embodiment of the present disclosure, the transmitting device determines the first resource map of the reference signal supporting Z antenna ports, and transmits the reference signal after the reference signal supporting Z antenna ports is mapped to the target time-frequency resource based on the first resource map, and the receiving device receives, based on the first resource map, the reference signal supporting Z antenna ports from the target time-frequency resource. Because the first resource map is repeated in time domain and/or frequency domain in the repetition unit of K resource units, each of the K resource units is corresponding to the second resource map of the reference signal supporting P antenna ports, and the P antenna ports corresponding to the second resource map for every two adjacent resource units include G same antenna ports and H different antenna ports, partial repetition of antenna ports in different resource units helps reduce a quantity of time-frequency resources occupied by reference signals in each resource unit and ensure a transmission density of the reference signals.

In an LTE system, a resource unit is a time-frequency resource unit that is used to carry transmitted data. The resource unit may be a physical resource block (Physical Resource Block, PRB), a physical resource block pair (PRB pair), a physical resource block group (RBG), or a virtual resource block (VRB). Optionally, one PRB pair includes 12 consecutive subcarriers in frequency domain, and includes 14 consecutive symbols in time domain. The symbol is an orthogonal frequency division multiplexing (OFDM) symbol or a single carrier frequency division multiple access (SC-FDMA) symbol of an LTE system in which frequency domain of a subcarrier is 15 kHz, or the symbol is a symbol of a communications system in which frequency domain of a subcarrier is greater than 15 kHz. One PRB pair occupies a resource of one transmission time length in time domain. In different LTE releases, the transmission time length may be any symbol quantity from one symbol to 14 symbols. In this embodiment of the present disclosure, an example in which the resource unit is a PRB pair is used for description.

In this embodiment of the present disclosure, there are three possible implementations for the first resource map.

In a first implementation, the first resource map is repeated in frequency domain in the repetition unit of K resource units, the K resource units occupy a same time domain resource in the reference signal resource set, and the K resource units are K consecutive resource units in frequency domain in the reference signal resource set.

In a second implementation, the first resource map is repeated in time domain in the repetition unit of K resource units, the K resource units occupy a same frequency domain resource in the reference signal resource set, and the K resource units are K consecutive resource units in time domain in the reference signal resource set.

In a third implementation, the first resource map is repeated in time domain and frequency domain in the repetition unit of K resource groups, and each resource group includes K resource units.

It should be noted that K is an integer greater than 2.

The following separately describes in detail the three implementations.

Figure 5:
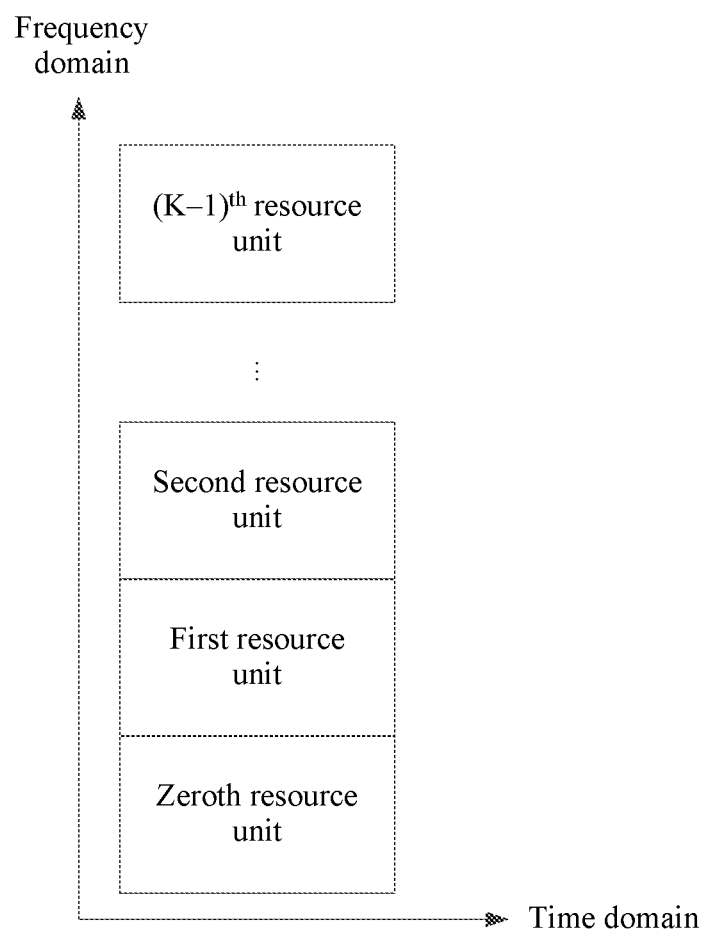
FIG. 5 is a schematic diagram of distribution of K resource units according to an embodiment of the present disclosure.

In the first possible implementation, the K resource units occupy the same time domain resource in the reference signal resource set, and are consecutive in frequency domain of the reference signal resource set. In other words, the K resource units are evenly arranged in frequency domain, and two adjacent resource units in frequency domain do not include another subcarrier, as shown in FIG. 5. In addition, no other resource unit exists between two adjacent resource units in frequency domain.

The reference signal is sent after the reference signal supporting Z antenna ports is mapped to target time domain based on the first resource map. Every K resource units in the first resource map are corresponding to Z antenna ports.

Optionally, the Z antenna ports include M groups of antenna ports, each group includes Y antenna ports, and Z=M*Y. Y is a power of 2.

Optionally, Y is an integer less than or equal to 8, for example, Y is 2, 4, or 8.

It should be noted that Z is an integer greater than or equal to 4, M is an integer greater than or equal to 2, and N is an integer greater than or equal to 2.

Each of the K resource units is corresponding to the second resource map of the reference signal supporting P antenna ports, and P<Z. The second resource map is obtained by aggregating N third resource maps, and P=N*Y. The P antenna ports corresponding to the second resource map for every two adjacent resource units include G same antenna ports and H different antenna ports, G=A*Y, H=B*Y, and A+B=N. In other words, in the K resource units, antenna ports corresponding to reference signals sent by any two resource units are not exactly the same; or antenna ports corresponding to at least B*Y reference signals in reference signals sent by any two resource units are different.

It should be noted that H is an integer greater than 2, G is an integer greater than 2, A is an integer greater than or equal to 1, and B is an integer greater than or equal to 1.

Optionally, each third resource map is corresponding to one group of antenna ports in the M groups of antenna ports.

It may be understood that the K resource units include K second resource maps, and each second resource map includes N third resource maps.

For example, Z=M*Y=32, M=4, Y=8, and K=4. Four resource units are used as the repetition unit. When reference signals corresponding to 4*8=32 antenna ports are sent in the four resource units, each resource unit is used to transmit reference signals corresponding to 3*8=24 antenna ports. In reference signals sent by any two adjacent resource units in frequency domain, there are 2*8=16 same antenna ports corresponding to the reference signals, and there are 1*8=8 different antenna ports corresponding to the reference signals.

It should be noted that Z is an integer greater than or equal to 4, K is an integer greater than 2, M is an integer greater than or equal to 2, and N is an integer greater than or equal to 2.

Figure 6:
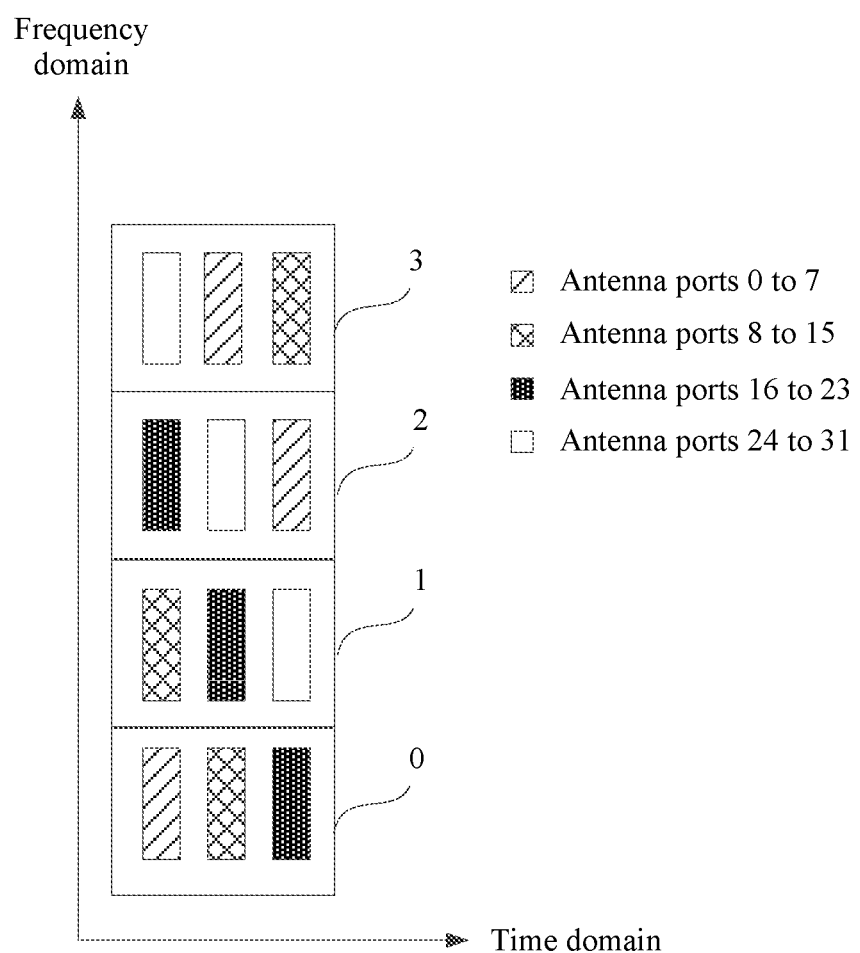
FIG. 6 is a schematic partial diagram of a first resource map according to an embodiment of the present disclosure.

Referring to FIG. 6, FIG. 6 is a schematic partial diagram corresponding to four resource units in a first resource map. The four resource units are numbered 0 to 3, and the four resource units 0 to 3 are corresponding to four second resource maps. A resource unit 0 includes three third resource maps, the three third resource maps are respectively corresponding to antenna ports 0 to 7, antenna ports 8 to 15, and antenna ports 16 to 23, and there are 3*8=24 antenna ports in total. A resource unit 1 also includes three third resource maps, and the three third resource maps are respectively corresponding to antenna ports 8 to 15, antenna ports 16 to 23, and antenna ports 24 to 31. A resource unit 2 also includes three third resource maps, and the three third resource maps are respectively corresponding to antenna ports 16 to 23, antenna ports 24 to 31, and antenna ports 0 to 7. A resource unit 3 also includes three third resource maps, and the three third resource maps are respectively corresponding to antenna ports 24 to 31, antenna ports 0 to 7, and antenna ports 8 to 15.

In the resource unit 0 and the resource unit 1 that are adjacent to each other, there are 16 same antenna ports corresponding to reference signals, to be specific, the antenna ports 8 to 15 and the antenna ports 16 to 23 are included, and there are eight different antenna ports corresponding to the reference signals, for example, the antenna ports 0 to 7 are different from the antenna ports 24 to 31.

Antenna ports corresponding to reference signals transmitted by any two resource units in the K resource units are not exactly the same. For example, in the resource units 0 and the resource unit 2 in the four resource units in FIG. 6, there are eight different antenna ports corresponding to reference signals, that is, the antenna ports 16 to 23, and there are 16 different antenna ports corresponding to the reference signals, for example, the antenna ports 0 to 7 are different from the antenna ports 8 to 15. One group of antenna ports in each second resource map is corresponding to one third resource map. There are four types of the third resource map in FIG. 6. For example, a time-frequency resource that is used to transmit reference signals corresponding to the antenna ports 8 to 15 in the resource unit 3 is corresponding to one third resource map.

Optionally, in the K resource units, a $j^{th}$ third resource map in an $i^{th}$ resource unit and a $j^{th}$ third resource map in an $(i+1)^{th}$ resource unit occupy a same time domain location in a time-frequency resource pattern corresponding to a single resource unit; and the $j^{th}$ third resource map in the $i^{th}$ resource unit is corresponding to one group of antenna ports in the M groups of antenna ports, and the $j^{th}$ third resource map in the $(i+1)^{th}$ resource unit is corresponding to another group of antenna ports in the M groups of antenna ports, where $0 \leq i \leq K-1$ and $0 \leq j \leq N-1$.

Numbers of resource units may be arranged from top to bottom or from bottom to top in frequency domain, or may be arranged from left to right or from right to left in time domain. This is not limited in this embodiment of the present disclosure. An example in which the numbers are arranged from bottom to top in frequency domain is used in this embodiment of the present disclosure.

Numbers of third resource maps may be arranged from top to bottom or from bottom to top in frequency domain, or may be arranged from left to right or from right to left in time domain. This is not limited in this embodiment of the present disclosure. A same numbering rule is used for third resource maps in each resource unit.

It should be noted that the group of antenna ports that is in the M groups of antenna ports and that is corresponding to the $j^{th}$ third resource map is different from the another group of antenna ports that is in the M groups of antenna ports and that is corresponding to the $j^{th}$ third resource map.

It should be noted that K is an integer greater than 2, M is an integer greater than or equal to 2, N is an integer greater than or equal to 2, and i and j are integers.

Referring to FIG. 6, the resource unit 0 and the resource unit 1 that are adjacent to each other in frequency domain are used as an example. A $0^{th}$ third resource map on the left side of the resource unit 0 and a $0^{th}$ third resource map on the left side of the resource unit 1 occupy a same time domain location and a same frequency domain location. A $1^{st}$ third resource map in the middle of the resource unit 0 and a $1^{st}$ third resource map in the middle of the resource unit 1 occupy a same time domain location and a same frequency domain location. A $3^{rd}$ third resource map on the right side of the resource unit 0 and a $3^{rd}$ third resource map on the right side of the resource unit 1 occupy a same time domain location and a same frequency domain location.

The $0^{th}$ third resource map on the left side of the resource unit 0 is corresponding to reference signals that are corresponding to the antenna ports 0 to 7, and the $0^{th}$ third resource map on the left side of the resource unit 1 is corresponding to reference signals that are corresponding to the antenna ports 8 to 15.

The $1^{st}$ third resource map in the middle of the resource unit 0 is corresponding to reference signals that are corresponding to the antenna ports 8 to 15, and the $1^{st}$ third resource map in the middle of the resource unit 1 is corresponding to reference signals that are corresponding to the antenna ports 16 to 23.

The $2^{nd}$ third resource map on the right side of the resource unit 0 is corresponding to reference signals that are corresponding to the antenna ports 16 to 23, and the $2^{nd}$ third resource map on the right side of the resource unit 1 is corresponding to reference signals that are corresponding to the antenna ports 24 to 31.

It can be seen from FIG. 6 that P antenna ports corresponding to the second resource map for every two adjacent resource units include G same antenna ports and H different antenna ports. Partial repetition of antenna ports in different resource units helps reduce a quantity of time-frequency resources occupied by reference signals in each resource unit and ensure a transmission density of the reference signals.

It should be noted that P is an integer greater than 2, H is an integer greater than 2, and G is an integer greater than 2.

Figure 7:
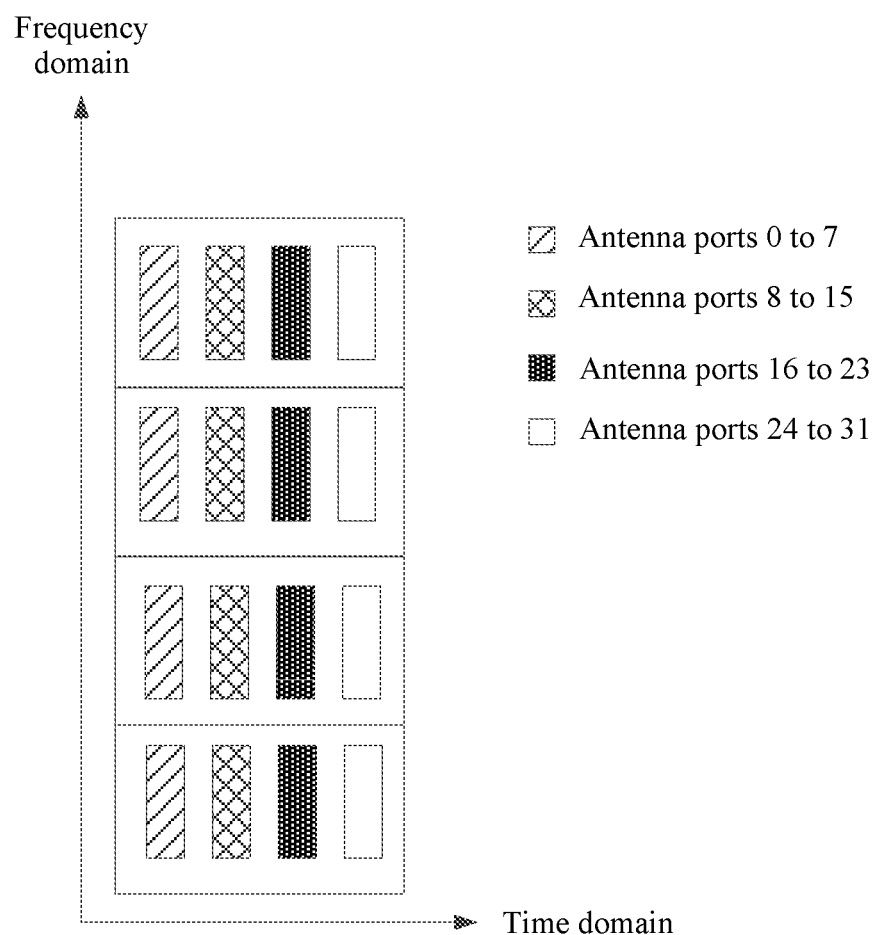
FIG. 7 is a schematic partial diagram of a first resource map according to an embodiment that is not provided in the present disclosure.
Figure 8:
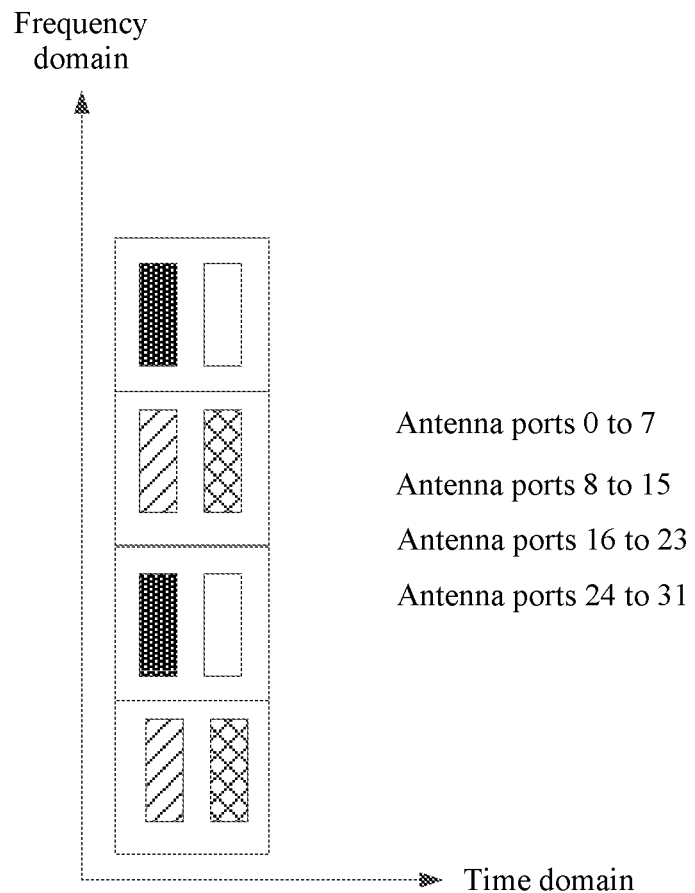
FIG. 8 is a schematic partial diagram of a first resource map according to another embodiment that is not provided in the present disclosure.

To describe the beneficial effects of the technical solution shown in FIG. 6 more clearly, with reference to FIG. 7 and FIG. 8, FIG. 7 and FIG. 8 respectively show schematic diagrams of transmission of reference signals corresponding to 32 antenna ports according to embodiments that are not provided in the present disclosure.

In a technical solution shown in FIG. 7, reference signals corresponding to 32 antenna ports are transmitted in each resource unit. In this case, each resource unit needs to occupy 32 time-frequency resource units, and a transmission density is 1, in other words, a reference signal corresponding to each antenna port appears once in each resource unit.

In a technical solution shown in FIG. 8, reference signals corresponding to 16 antenna ports are transmitted in each resource unit, and antenna ports corresponding to reference signals transmitted in two adjacent resource units are different. In this case, each resource unit needs to occupy 16 time-frequency resource units, and a transmission density is 0.5, in other words, a reference signal corresponding to each antenna port appears once in every two resource units.

In the technical solution shown in FIG. 6, each resource unit needs to occupy 24 time-frequency resource units, and in this case, a transmission density is 0.75, in other words, a reference signal corresponding to each antenna port appears three times in every four resource units. Therefore, the manner shown in FIG. 6 can not only reduce a quantity of time-frequency resources occupied by reference signals corresponding to all antenna ports in each resource unit, but also ensure a transmission density of the reference signals.

It should be noted that numbers of antenna ports in FIG. 6, FIG. 7, and FIG. 8 are merely for example description, and do not indicate a specific number of an antenna port. This is not limited in this embodiment of the present disclosure.

Figure 9:
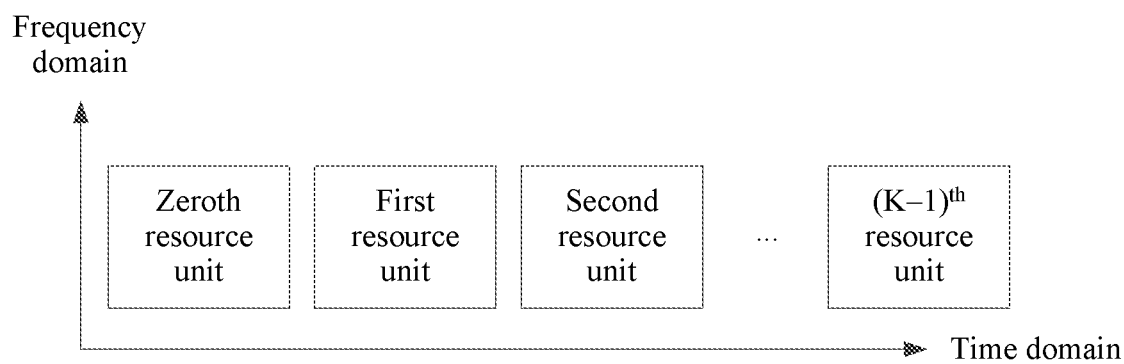
FIG. 9 is a schematic diagram of distribution of K resource units according to another embodiment of the present disclosure.

In the second possible implementation, different from the manners shown in FIG. 5 and FIG. 6, the K resource units occupy the same frequency domain resource in the reference signal resource set, and the K resource units are consecutive in time domain of the reference signal resource set. In other words, the K resource units are evenly arranged in time domain, and two adjacent resource units in time domain do not include a first symbol. The first symbol is configured as a symbol for transmitting the reference signal. However, two adjacent resource units in time domain may include a second symbol, and the second symbol is configured as a symbol for transmitting a signal other than the reference signal, as shown in FIG. 9. In addition, no other resource unit exists between two adjacent resource units in time domain.

The reference signal is sent after the reference signal supporting Z antenna ports is mapped to target time domain based on the first resource map. Every K resource units are corresponding to Z antenna ports, the Z antenna ports include M groups of antenna ports, each group includes Y antenna ports, and Z=M*Y. Y is a power of 2.

Optionally, Y is an integer less than or equal to 8, for example, Y is 2, 4, or 8.

Each of the K resource units is corresponding to the second resource map of the reference signal supporting P antenna ports, and P<Z. The second resource map is obtained by aggregating N third resource maps, and P=N*Y. The P antenna ports corresponding to the second resource map for every two adjacent resource units include G same antenna ports and H different antenna ports, G=A*Y, H=B*Y, and A+B=N. In other words, in the K resource units, antenna ports corresponding to reference signals sent by any two resource units are not exactly the same; or antenna ports corresponding to at least B*Y reference signals in reference signals sent by any two resource units are different.

Optionally, each third resource map is corresponding to one group of antenna ports in the M groups of antenna ports.

It may be understood that the K resource units in the first resource map include K second resource maps, and each second resource map includes N third resource maps.

For example, Z=M*Y=32, M=4, Y=8, and K=4. Four resource units are used as the repetition unit. When reference signals corresponding to 4*8=32 antenna ports are sent in the four resource units, each resource unit is used to transmit reference signals corresponding to 3*8=24 antenna ports. In reference signals sent by any two adjacent resource units, there are 2*8=16 same antenna ports corresponding to the reference signals, and there are 1*8=8 different antenna ports corresponding to the reference signals.

It should be noted that Z is an integer greater than or equal to 4, K is an integer greater than 2, M is an integer greater than or equal to 2, N is an integer greater than or equal to 2, P is an integer greater than 2, H is an integer greater than 2, G is an integer greater than 2, A is an integer greater than or equal to 1, and B is an integer greater than or equal to 1.

Figure 10:
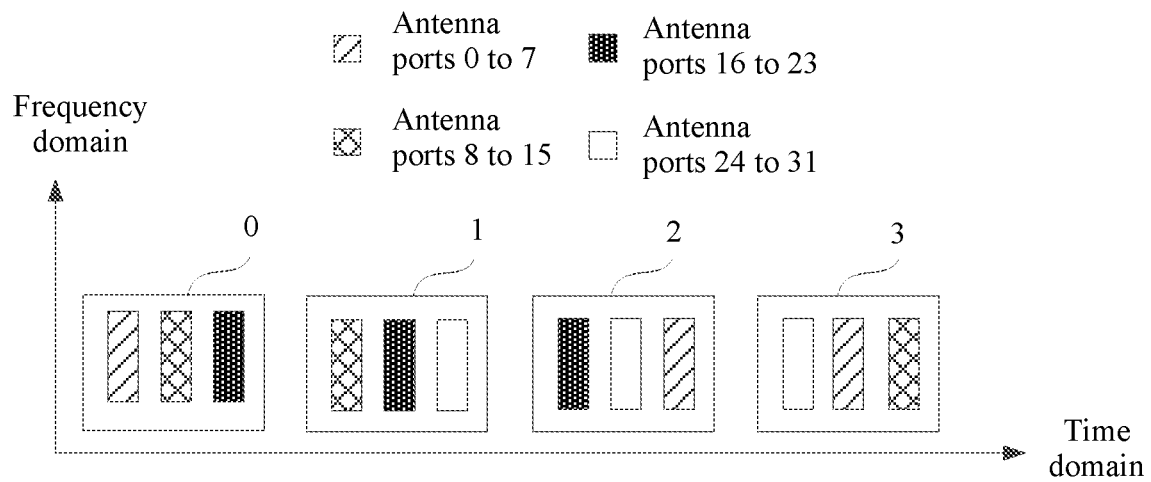
FIG. 10 is a schematic diagram of implementing a reference signal transmitting/receiving method according to another embodiment of the present disclosure.

Referring to FIG. 10, FIG. 10 is a schematic partial diagram corresponding to K resource units in a first resource map. The four resource units are numbered 0 to 3, and the four resource units 0 to 3 are corresponding to four second resource maps. A resource unit 0 includes three third resource maps, the three third resource maps are respectively corresponding to antenna ports 0 to 7, antenna ports 8 to 15, and antenna ports 16 to 23, and there are 3*8=24 antenna ports in total. A resource unit 1 also includes three third resource maps, and the three third resource maps are respectively corresponding to antenna ports 8 to 15, antenna ports 16 to 23, and antenna ports 24 to 31. A resource unit 2 also includes three third resource maps, and the three resource maps are respectively corresponding to antenna ports 16 to 23, antenna ports 24 to 31, and antenna ports 0 to 7. A resource unit 3 also includes three third resource maps, and the three third resource maps are respectively corresponding to antenna ports 24 to 31, antenna ports 0 to 7, and antenna ports 8 to 15.

In the resource unit 0 and the resource unit 1 that are adjacent to each other, there are 16 same antenna ports corresponding to reference signals, to be specific, the antenna ports 8 to 15 and the antenna ports 16 to 23 are included, and there are eight different antenna ports corresponding to the reference signals, for example, the antenna ports 0 to 7 are different from the antenna ports 24 to 31.

Antenna ports corresponding to reference signals transmitted by any two resource units are not exactly the same. For example, in the resource units 0 and the resource unit 2, there are eight different antenna ports corresponding to reference signals, that is, the antenna ports 16 to 23, and there are 16 different antenna ports corresponding to the reference signals, for example, the antenna ports 0 to 7 are different from the antenna ports 8 to 15.

Optionally, in the K resource units, a $j^{th}$ third resource map in an $i^{th}$ resource unit and a $j^{th}$ third resource map in an $(i+1)^{th}$ resource unit occupy a same time domain location in a time-frequency resource pattern corresponding to a single resource unit; and the $j^{th}$ third resource map in the $i^{th}$ resource unit is corresponding to one group of antenna ports in the M groups of antenna ports, and the $j^{th}$ third resource map in the $(i+1)^{th}$ resource unit is corresponding to another group of antenna ports in the M groups of antenna ports.

Numbers of resource units may be arranged from top to bottom or from bottom to top in frequency domain, or may be arranged from left to right or from right to left in time domain. This is not limited in this embodiment of the present disclosure. An example in which the numbers are arranged from bottom to top in frequency domain is used in this embodiment of the present disclosure.

Numbers of third resource maps may be arranged from top to bottom or from bottom to top in frequency domain, or may be arranged from left to right or from right to left in time domain. This is not limited in this embodiment of the present disclosure. A same numbering rule is used for third resource maps in each resource unit.

It should be noted that the group of antenna ports that is in the M groups of antenna ports and that is corresponding to the $j^{th}$ third resource map is different from the another group of antenna ports that is in the M groups of antenna ports and that is corresponding to the $j^{th}$ third resource map.

It should be noted that Z is an integer greater than or equal to 4, K is an integer greater than 2, M is an integer greater than or equal to 2, N is an integer greater than or equal to 2, P is an integer greater than 2, H is an integer greater than 2, G is an integer greater than 2, A is an integer greater than or equal to 1, B is an integer greater than or equal to 1, and i and j are integers.

It should be noted that numbers of antenna ports in FIG. 10 are merely for example description, and do not indicate a specific number of an antenna port. This is not limited in this embodiment of the present disclosure.

Figure 11:
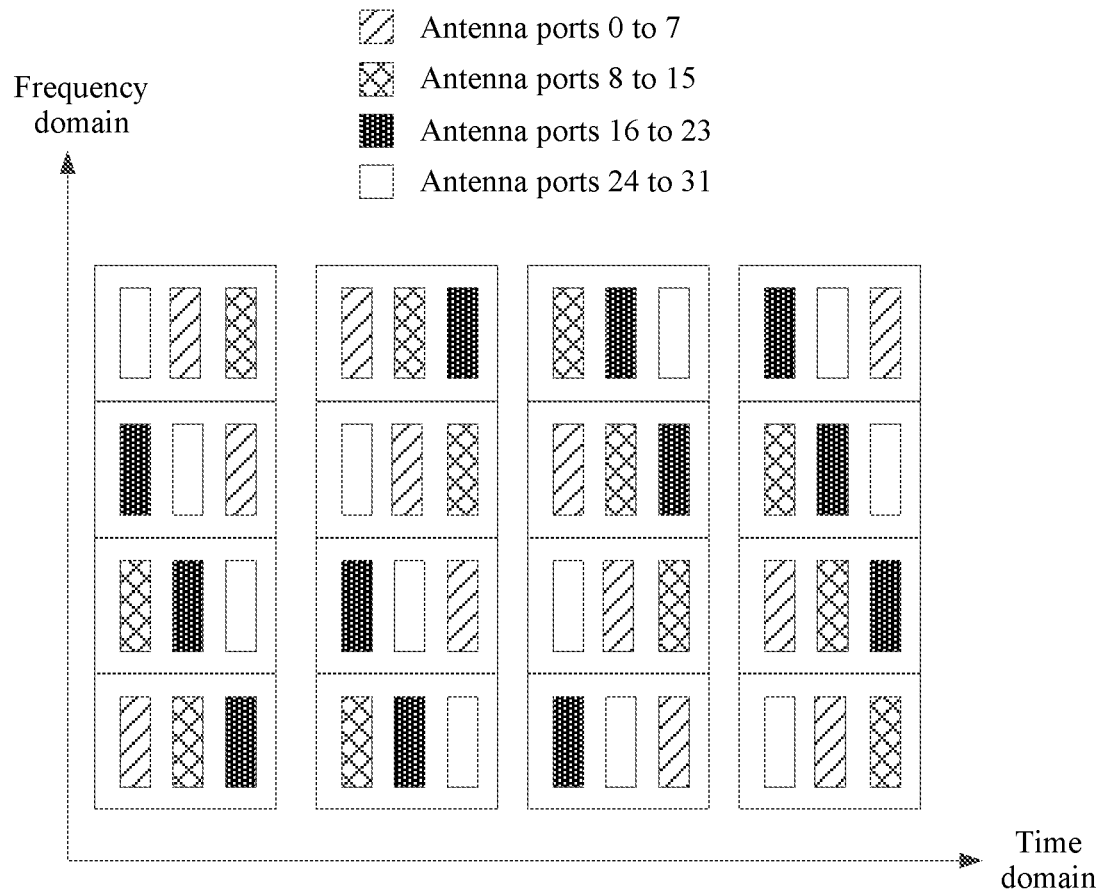
FIG. 11 is a schematic diagram of implementing a reference signal transmitting/receiving method according to another embodiment of the present disclosure.

In the third possible implementation, the first resource map includes K repetition units that are arranged in sequence at different time domain locations, each repetition unit includes several resource units, and locations of the resource units are the same in each repetition unit, as shown in FIG. 11.

FIG. 11 shows a schematic partial diagram of a first resource map. The schematic partial diagram includes one repetition unit, and the repetition unit includes 16 resource units. A manner used by four resource units at a same time domain location in each repetition unit during reference signal transmission is same as or similar to the manner shown in FIG. 6. Details are not described herein again. A manner used by four resource units at a same frequency domain location in each repetition unit during reference signal transmission is same as or similar to the manner shown in FIG. 10. Details are not described herein again.

It should be noted that numbers of antenna ports in FIG. 11 are merely for example description, and do not indicate a specific number of an antenna port. This is not limited in this embodiment of the present disclosure.

In the foregoing embodiment, assuming that each third resource map occupies one OFDM symbol pair in time domain, the three third resource maps in each resource unit occupy three pairs of OFDM symbols, or the three third resource maps in each resource unit may occupy two pairs or one pair of OFDM symbols.

The OFDM symbol pair is two consecutive OFDM symbols, for example, a fifth OFDM symbol and a sixth OFDM symbol are one OFDM symbol pair.

For example, Z=M*Y=32, M=4, Y=8, and K=4. Four resource units are used as the repetition unit. When reference signals corresponding to 4*8=32 antenna ports are sent in the four resource units, each resource unit is used to transmit reference signals corresponding to 3*8=24 antenna ports.

Figure 12:
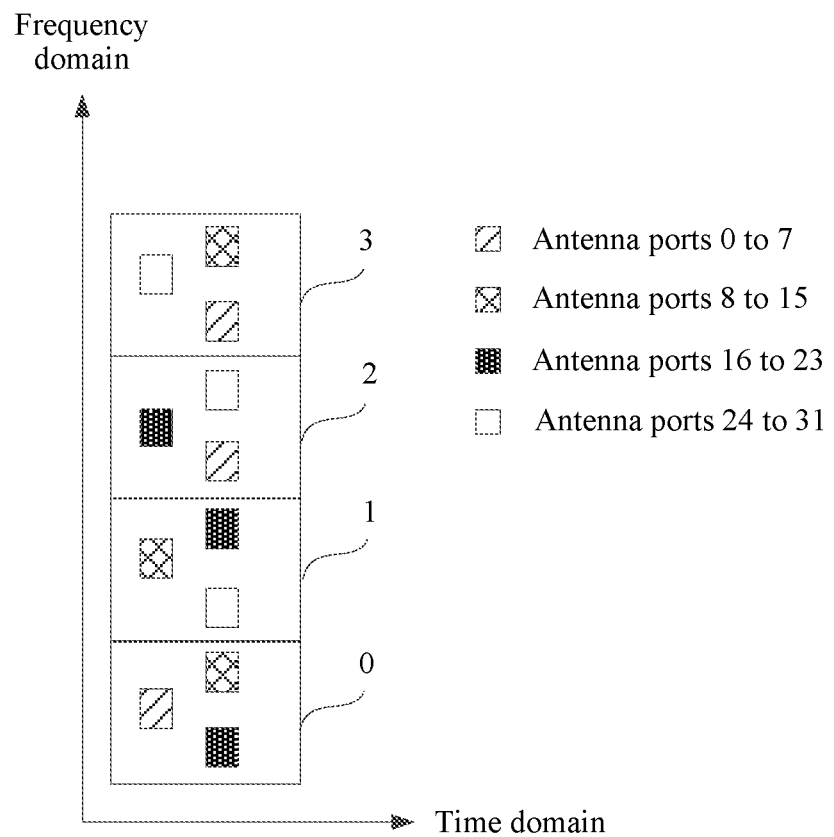
FIG. 12 is a schematic diagram of implementing a reference signal transmitting/receiving method according to another embodiment of the present disclosure.

Referring to FIG. 12, four resource units are numbered 0 to 3. In a resource unit 0, 3*8 reference signals are transmitted, and the 3*8 reference signals are respectively corresponding to antenna ports 0 to 7, antenna ports 8 to 15, and antenna ports 16 to 23. In a resource unit 1, 3*8 reference signals are transmitted, and the 3*8 reference signals are respectively corresponding to antenna ports 8 to 15, antenna ports 16 to 23, and antenna ports 24 to 31. In a resource unit 2, 3*8 reference signals are transmitted, and the 3*8 reference signals are respectively corresponding to antenna ports 16 to 23, antenna ports 24 to 31, and antenna ports 0 to 7. In a resource unit 3, 3*8 reference signals are transmitted, and the 3*8 reference signals are respectively corresponding to antenna ports 24 to 31, antenna ports 0 to 7, and antenna ports 8 to 15. Each resource unit includes three third resource maps, and the three third resource maps occupy two pairs of OFDM symbols.

It should be noted that Z is an integer greater than or equal to 4, K is an integer greater than 2, M is an integer greater than or equal to 2, and N is an integer greater than or equal to 2.

It should be noted that numbers of antenna ports in FIG. 12 are merely for example description, and do not indicate a specific number of an antenna port. This is not limited in this embodiment of the present disclosure.

Optionally, N groups of antenna ports corresponding to a second resource map of a $k^{th}$ resource unit are a $((k \bmod M)+\beta)^{th}$ group of antenna ports, a $(((k+1) \bmod M)+\beta)^{th}$ group of antenna ports, ..., and a $(((k+N-1) \bmod M)+\beta)^{th}$ group of antenna ports in the M groups of antenna ports, where $0 \leq k \leq K-1$, and $\beta$ is a predetermined offset.

"k mod M" indicates a remainder of k divided by M. Referring to FIG. 6, for example, k is 0, $\beta$ is 0, and there are four groups of antenna ports numbered 0 to 3. Three groups of antenna ports corresponding to the second resource map of the resource unit 0 are a zeroth group of antenna ports 0 to 7, a first group of antenna ports 8 to 15, and a second group of antenna ports 16~23 in the four groups of antenna ports. It should be noted that K is an integer greater than 2, M is an integer greater than or equal to 2, and k is an integer greater than or equal to 0.

In the foregoing embodiment, Z=M*Y=4*8=32 antenna ports are used as an example for description. In different embodiments, there may be 8, 16, 20, 24, 64, or another quantity of antenna ports. Every Y antenna ports are considered as a group of antenna ports, and Y is a power of 2.

When there are eight antenna ports, the antenna ports may be divided into four groups, and each group includes two antenna ports. A second resource map includes N third resource maps, and 1<N<4. Alternatively, the antenna ports may be divided into two groups, and each group includes four antenna ports. A second resource map includes N third resource maps, and N=2.

When there are 16 antenna ports, the antenna ports may be divided into eight groups, and each group includes two antenna ports. A second resource map includes N third resource maps, and 1<N<7. Alternatively, the antenna ports may be divided into four groups, and each group includes four antenna ports. A second resource map includes N third resource maps, and 1<N<4. Alternatively, the antenna ports may be divided into two groups, and each group includes eight antenna ports. A second resource map includes N third resource maps, and N=2.

When there are 20 antenna ports, the antenna ports may be divided into ten groups, and each group includes two antenna ports. A second resource map includes N third resource maps, and 1<N<10. Alternatively, the antenna ports may be divided into five groups, and each group includes four antenna ports. A second resource map includes N third resource maps, and 1<N<5.

When there are 24 antenna ports, the antenna ports may be divided into 12 groups, and each group includes two antenna ports. A second resource map includes N third resource maps, and 1<N<12. Alternatively, the antenna ports may be divided into six groups, and each group includes four antenna ports. A second resource map includes N third resource maps, and 1<N<6. Alternatively, the antenna ports may be divided into three groups, and each group includes eight antenna ports. A second resource map includes N third resource maps, and N=2.

When there are 28 antenna ports, the antenna ports may be divided into 14 groups, and each group includes two antenna ports. A second resource map includes N third resource maps, and 1<N<14. Alternatively, the antenna ports may be divided into seven groups, and each group includes four antenna ports. A second resource map includes N third resource maps, and 1<N<7.

When there are 32 antenna ports, the antenna ports may be divided into 16 groups, and each group includes two antenna ports. A second resource map includes N third resource maps, and 1<N<16. Alternatively, the antenna ports may be divided into eight groups, and each group includes four antenna ports. A second resource map includes N third resource maps, and 1<N<8. Alternatively, the antenna ports may be divided into four groups, and each group includes eight antenna ports. A second resource map includes N third resource maps, and 1<N<4.

Things like that are not repeatedly described herein. Reference signals of each group of antenna ports may be corresponding to one third resource map in one resource unit. Optionally, reference signals corresponding to a same group of antenna ports are transmitted in a code division multiplexing (Code-Division Multiplexing, CDM) manner, in other words, spectrum spreading transmission is performed on the reference signals by using orthogonal cover code (Orthogonal Cover Code, OCC).

The M groups of antenna ports may also comply with the following rules.

According to a first rule, numbers of antenna ports in each of the M groups are consecutive, and a number $p^{(m)}$ of an antenna port in an $m^{th}$ group is: $p^{(m)}=[m*Y+\alpha, (m+1)*Y-1+\alpha]$, where $0 \leq m \leq M-1$, and $\alpha$ is a predetermined offset. Optionally, when the reference signal is a channel state information-reference signal (Channel state information reference, CSI-RS), $\alpha$ is 15.

Antenna ports corresponding to Y reference signals corresponding to the Y antenna ports in each group of antenna ports have a same polarization direction.

It should be noted that Z is an integer greater than or equal to 4, K is an integer greater than 2, M is an integer greater than or equal to 2, and N is an integer greater than or equal to 2.

Figure 13:
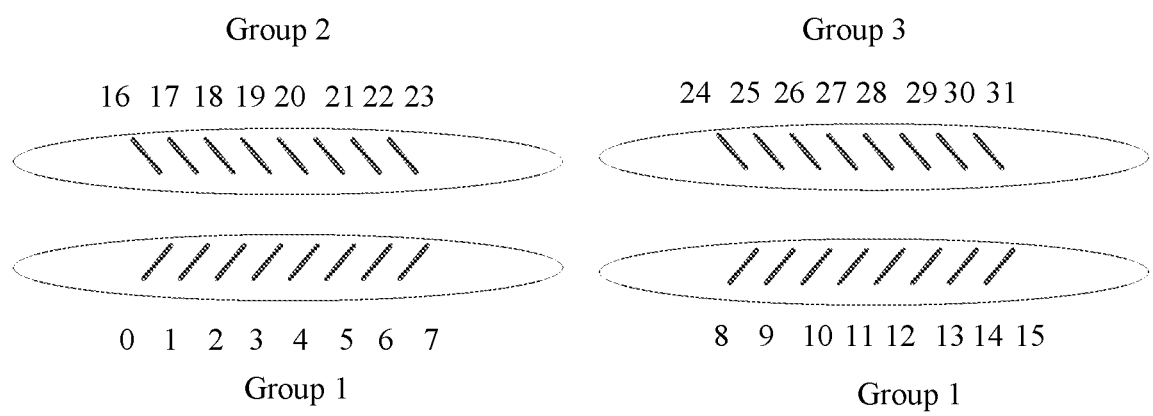
FIG. 13 is a schematic diagram of polarization directions of antenna ports according to an embodiment of the present disclosure.

As shown in FIG. 13, 32 antenna ports are used as an example, $\alpha$ is 0, and four groups of antenna ports are numbered 0 to 3. Numbers of antenna ports in a zeroth group are consecutive 0 to 7, and the eight antenna ports have a same polarization direction: +45 degrees. Numbers of antenna ports in a first group are consecutive 8 to 15, and the eight antenna ports have a same polarization direction: +45 degrees. Numbers of antenna ports in a second group are consecutive 16 to 23, and the eight antenna ports have a same polarization direction: −45 degrees. Numbers of antenna ports in a third group are consecutive 24 to 31, and the eight antenna ports have a same polarization direction: −45 degrees.

According to a second rule, some of numbers of antenna ports in each of the M groups are consecutive, and a number $p^{(m)}$ of an antenna port in an $m^{th}$ group is:

$$p^{(m)} = \begin{cases} p' + \frac{Y}{2}m + \alpha, \ p' = 0, 1, 2, \ldots, \frac{Y}{2} - 1 \\ p' + \frac{Y}{2}(m + M - 1) + \alpha, \ p' = \frac{Y}{2}, \frac{Y}{2} + 1, \frac{Y}{2} + 1, \ldots, Y - 1 \end{cases}.$$

A first group of antenna ports in the $m^{th}$ group of antenna ports have a same first polarization direction, a second group of antenna ports have a same second polarization direction, and the first polarization direction is different from the second polarization direction.

Figure 14:
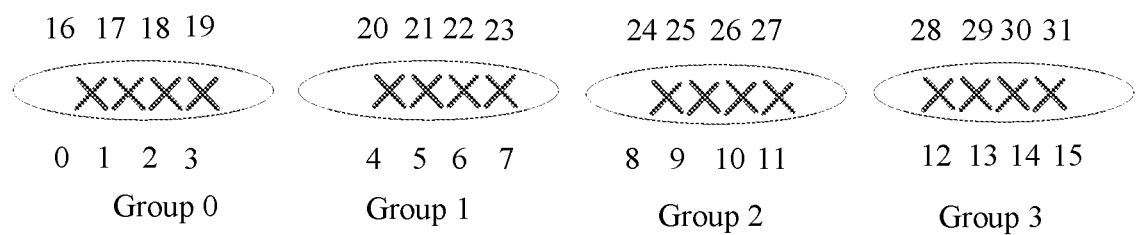
FIG. 14 is a schematic diagram of polarization directions of antenna ports according to another embodiment of the present disclosure.

As shown in FIG. 14, 32 antenna ports are used as an example, $\alpha$ is 0, and four groups of antenna ports are numbered 0 to 3. Some of numbers of antenna ports in a zeroth group are consecutive, the numbers are respectively 0 to 3 and 16 to 19, antenna ports 0 to 3 have consecutive numbers and have the first polarization direction: +45 degrees, and antenna ports 16 to 19 have consecutive numbers and have the second polarization direction: −45 degrees. Some of numbers of antenna ports in a first group are consecutive, the numbers are respectively 4 to 7 and 20 to 23, antenna ports 4 to 7 have consecutive numbers and have the first polarization direction: +45 degrees, and antenna ports 20 to 23 have consecutive numbers and have the second polarization direction: −45 degrees. Some of numbers of antenna ports in a second group are consecutive, the numbers are respectively 8 to 11 and 24 to 27, antenna ports 8 to 11 have consecutive numbers and have the first polarization direction: +45 degrees, and antenna ports 24 to 27 have consecutive numbers and have the second polarization direction: −45 degrees. Some of numbers of antenna ports in a third group are consecutive, the numbers are respectively 12 to 15 and 28 to 31, antenna ports 12 to 15 have consecutive numbers and have the first polarization direction: +45 degrees, and antenna ports 28 to 31 have consecutive numbers and have the second polarization direction: −45 degrees.

It should be noted that numbers of antenna ports in FIG. 13 and FIG. 14 are merely for example description, and do not indicate a specific number of an antenna port. This is not limited in this embodiment of the present disclosure.

In an optional embodiment, the reference signal mentioned in the foregoing embodiment is a demodulation reference signal (DMRS), a channel state information-reference signal (CSI-RS), or a cell-specific reference signal (CRS).

Figure 15:
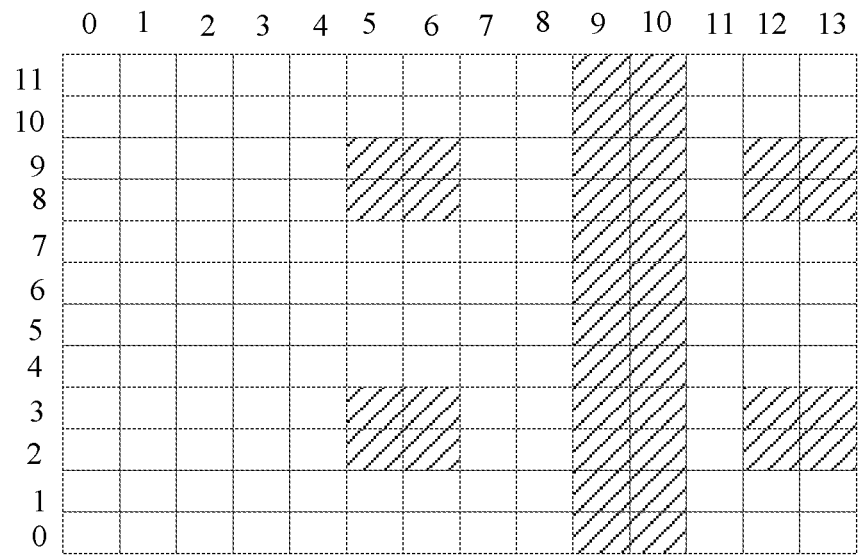
FIG. 15 is a schematic diagram of resource elements that can be occupied by a CSI-RS in each resource unit.

For example, the reference signal is a CSI-RS, and the resource unit is PRB pair. A PRB pair that uses a normal cyclic prefix includes 12 subcarriers in frequency domain and 14 symbols in time domain. A time-frequency resource that may be occupied by the CSI-RS in each PRB pair includes 40 resource elements (resource element, RE), as shown in a shadow area in FIG. 15.

The first resource map is obtained by aggregating the K second resource maps, and each second resource map is obtained by aggregating N third resource maps. A resource mapping manner of each third resource map may be as follows:

For example, the M*Y antenna ports are 32 antenna ports. CSI-RSs corresponding to the 32 antenna ports are sent in four resource units, the antenna ports may be divided into four groups, and each group includes eight antenna ports.

The eight antenna ports in each group are corresponding to eight REs in the 40 REs, and every eight REs form a third resource map. In this case, the 40 REs may be divided into five CSI-RS configurations of third resource maps. Each CSI-RS configuration is corresponding to one third resource map, and the five CSI-RS configurations are shown in Table 1.

TABLE 1

| CSI-RS configuration | Initial RE location (k, l) of each CSI-RS configuration Normal cyclic prefix |
|---|---|
| 0 | (9, 5) |
| 1 | (9, 9) |

TABLE 1-continued

| CSI-RS configuration | Initial RE location (k, l) of each CSI-RS configuration Normal cyclic prefix |
|---|---|
| 2 | (9, 12) |
| 3 | (11, 9) |
| 4 | (7, 9) |

For eight REs in each CSI-RS configuration, assuming that k is a subcarrier number of the RE in the PRB pair and l is a symbol number of the RE in the PRB pair, the eight REs in each CSI-RS configuration may be obtained through calculation based on an initial RE location in the configuration, formula 1, and formula 2.

$$k = k' + 12m + \begin{cases} -0, p' \in \{p0, p1\}, \text{Normal cyclic prefix} \\ -6, p' \in \{p2, p3\}, \text{Normal cyclic prefix} \\ -1, p' \in \{p4, p5\}, \text{Normal cyclic prefix} \\ -7, p' \in \{p6, p7\}, \text{Normal cyclic prefix} \end{cases} \quad \text{Formula 1}$$

$l=l'+l''$, CSI-RS configurations 0 to 4, Normal cyclic prefix   Formula 2

$l''=0, 1$; $m=0, 1, \ldots, N_{RB}^{DL}-1$; and $N_{RB}^{DL}$ represents a quantity of resource blocks included in a downlink.

The antenna ports p0 to p8 may be numbers of any eight antenna ports that belong to a same group.

With reference to Table 1, formula 1, and formula 2, the 40 REs may be divided into five third resource maps based on the CSI-RS configurations in Table 1. Each third resource map includes eight REs, and each third resource map may be used to transmit CSI-RSs corresponding to the eight antenna ports. Optionally, spectrum spreading is performed, by using spreading code of OCC=8, on the eight CSI-RSs corresponding to each third resource map, and the spreading code of OCC=8 is [1 1 1 1 −1 −1 −1 −1], [1 1 1 1 1 1 1 1], [1 1 −1 −1 −1 −1 1 1], [1 1 −1 −1 1 1 −1 −1], [1 −1 −1 1 1 −1 −1 1], [1 −1 −1 1 −1 1 1 −1], [1 −1 1 −1 1 −1 1 −1], and [1 −1 1 −1 −1 1 −1 1].

Figure 16A:
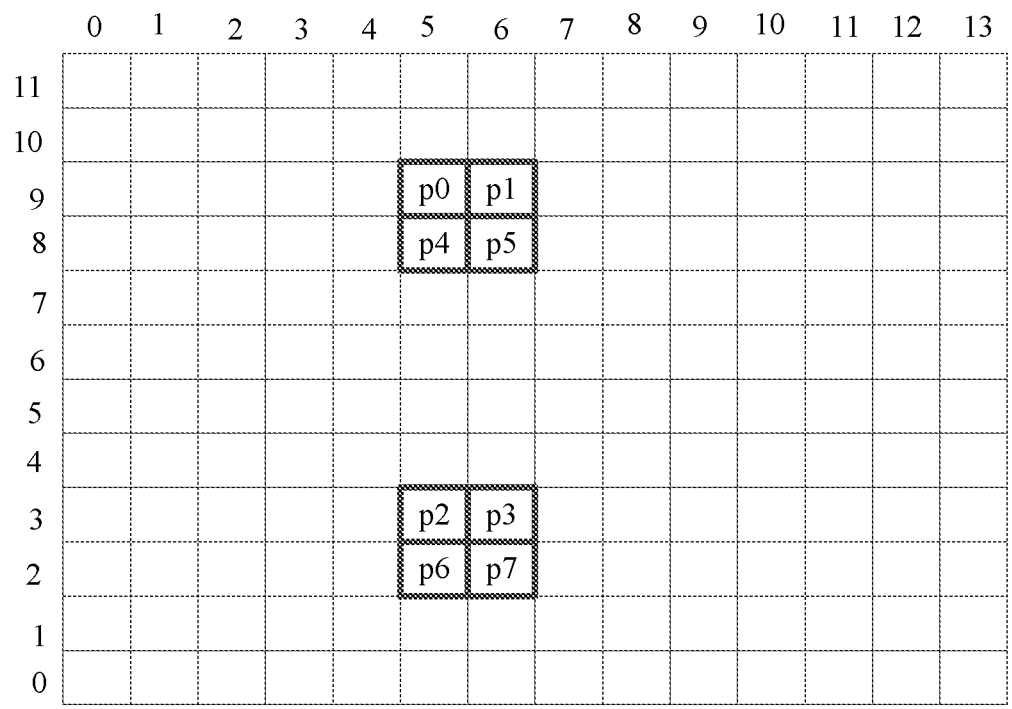
FIG. 16A is a schematic diagram of a CSI-RS configuration manner of each group of eight antenna ports.

In the CSI-RS configuration 0 in Table 1, eight REs starting from (9, 5) are indicated, and the eight REs may be used to transmit antenna ports p0 to p8. According to formula 1 and formula 2, it may be learned that:

the antenna port p0 is corresponding to k=9−0=9 and l=5+0=5, that is, RE (9, 5);
the antenna port p1 is corresponding to k=9−0=9 and l=5+1=6, that is, RE (9, 6);
the antenna port p2 is corresponding to k=9−6=3 and l=5+0=5, that is, RE (3, 5);
the antenna port p3 is corresponding to k=9−6=3 and l=5+1=6, that is, RE (3, 6);
the antenna port p4 is corresponding to k=9−1=8 and l=5+0=5, that is, RE (8, 5);
the antenna port p5 is corresponding to k=9−1=8 and l=5+1=6, that is, RE (8, 6);
the antenna port p6 is corresponding to k=9−7=2 and l=5+0=5, that is, RE (2, 5); and
the antenna port p7 is corresponding to k=9−7=2 and l=5+1=6, that is, RE (2, 6), as shown in FIG. 16A.

Figure 16B:
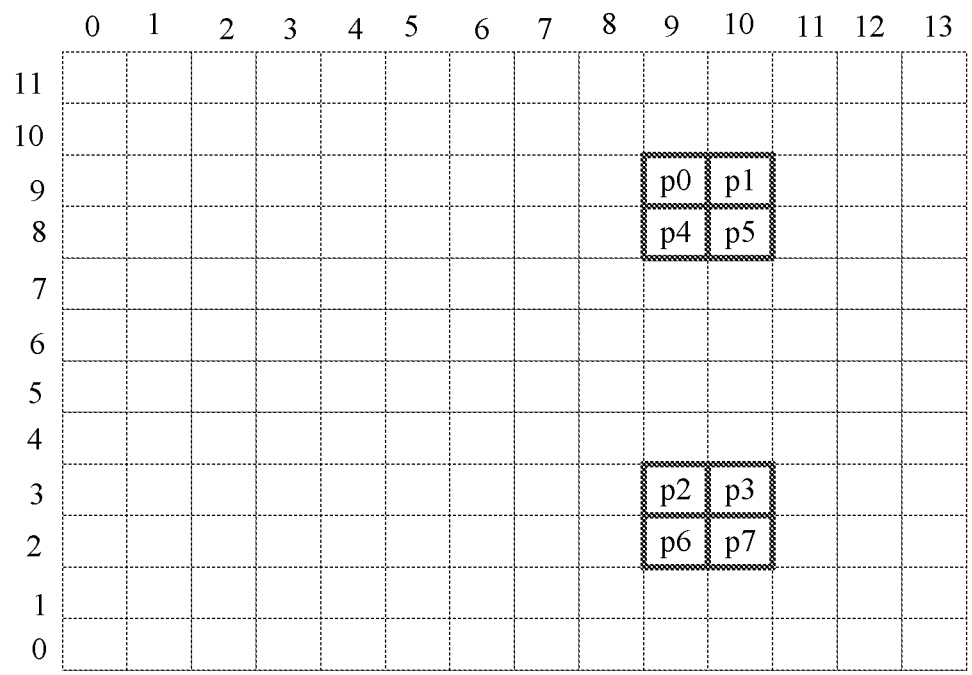
FIG. 16B is a schematic diagram of a CSI-RS configuration manner of each group of eight antenna ports.
Figure 16C:
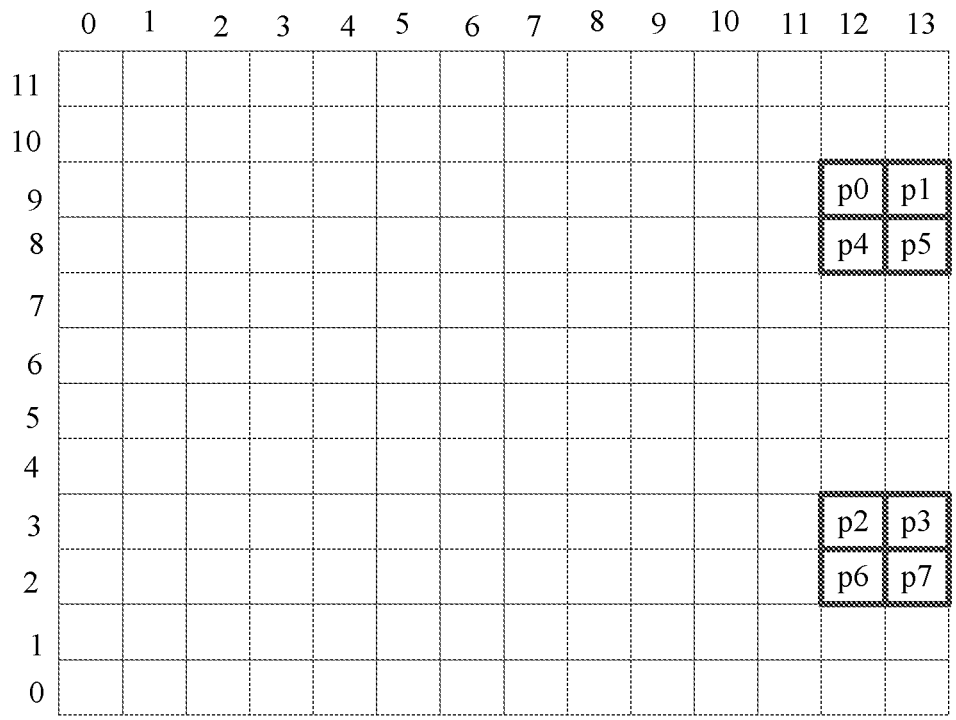
FIG. 16C is a schematic diagram of a CSI-RS configuration manner of each group of eight antenna ports.
Figure 16D:
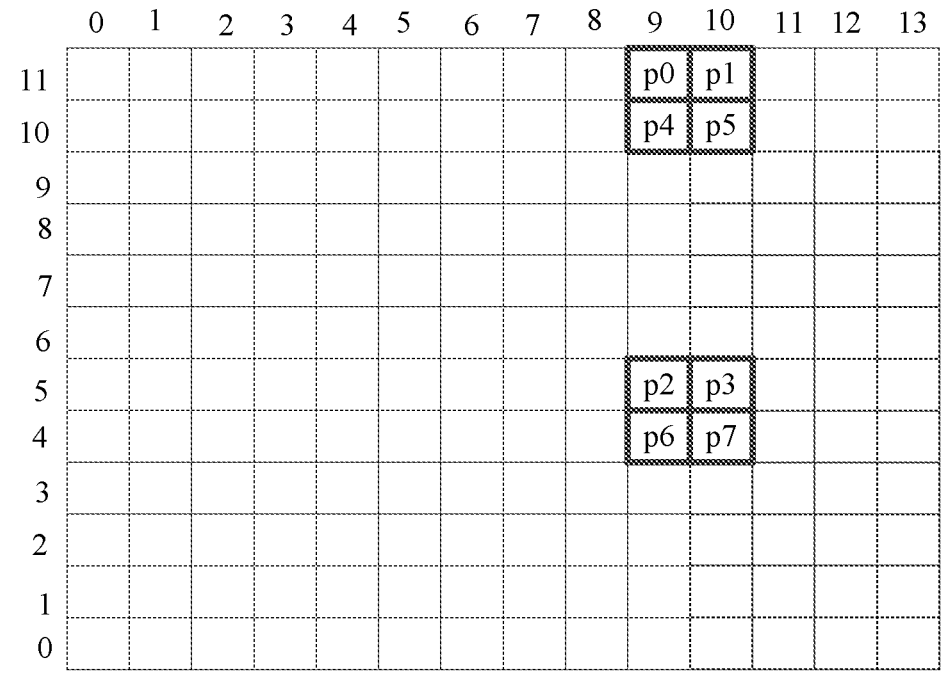
FIG. 16D is a schematic diagram of a CSI-RS configuration manner of each group of eight antenna ports.
Figure 16E:
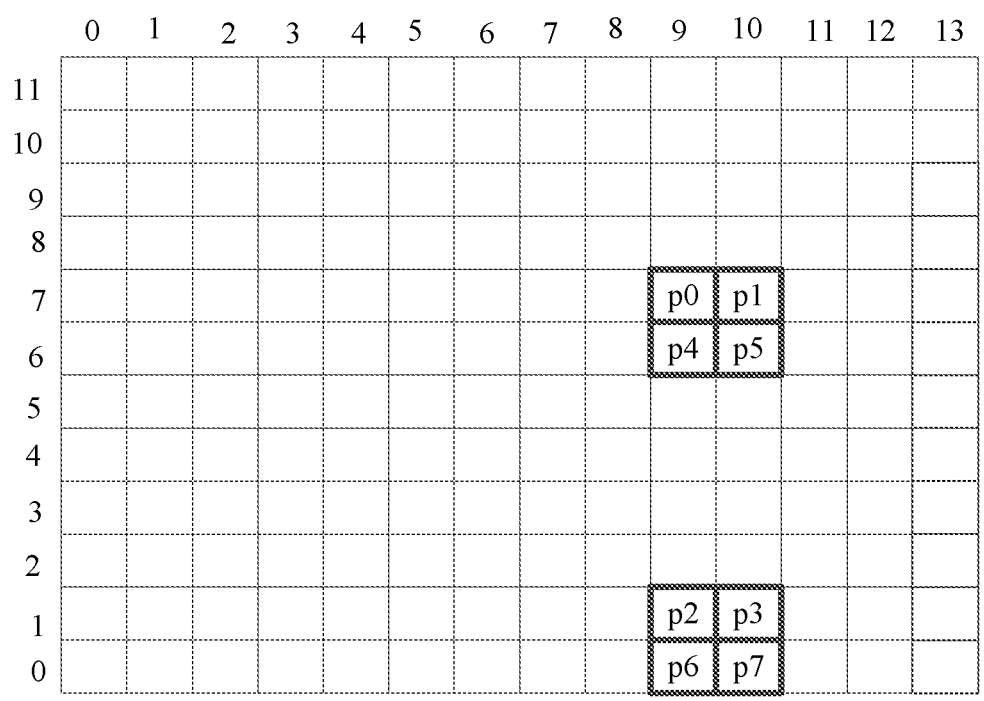
FIG. 16E is a schematic diagram of a CSI-RS configuration manner of each group of eight antenna ports.

Likewise, in the CSI-RS configuration 1 in Table 1, eight REs starting from (9, 9) are indicated, as shown in FIG. 16B. In the CSI-RS configuration 2 in Table 1, eight REs starting from (9, 12) are indicated, as shown in FIG. 16C. In the CSI-RS configuration 3 in Table 1, eight REs starting from (11, 9) are indicated, as shown in FIG. 16D. In the CSI-RS configuration 4 in Table 1, eight REs starting from (7, 9) are indicated, as shown in FIG. 16E.

When the reference signal is a CSI-RS, there are 32 antenna ports in total, the 32 antenna ports are divided into four groups, and each group includes eight antenna ports, three third resource maps in each resource unit occupy time-frequency resources indicated by three CSI-RS configurations in the five CSI-RS configurations shown in Table 1.

That three third resource maps in each resource unit occupy time-frequency resources indicated by three CSI-RS configurations in the five CSI-RS configurations may include the following cases:

First. The three third resource maps in each resource unit occupy time-frequency resources indicated by the CSI-RS configuration 0, the CSI-RS configuration 1, and the CSI-RS configuration 2 in the five CSI-RS configurations.

Second. The three third resource maps in each resource unit occupy time-frequency resources indicated by the CSI-RS configuration 0, the CSI-RS configuration 2, and the CSI-RS configuration 3 in the five CSI-RS configurations.

Third. The three third resource maps in each resource unit occupy time-frequency resources indicated by the CSI-RS configuration 0, the CSI-RS configuration 2, and the CSI-RS configuration 4 in the five CSI-RS configurations.

Fourth. The three third resource maps in each resource unit occupy time-frequency resources indicated by the CSI-RS configuration 1, the CSI-RS configuration 3, and the CSI-RS configuration 4 in the five CSI-RS configurations.

It should be noted that the terms "first", "second", "third", and "fourth" are merely intended for a purpose of description, and shall not be understood as an indication or implication of relative importance or implicit indication of a quantity of indicated technical features. Therefore, a feature limited by "first", "second", "third", or "fourth" may explicitly or implicitly include one or more features.

Figure 17:
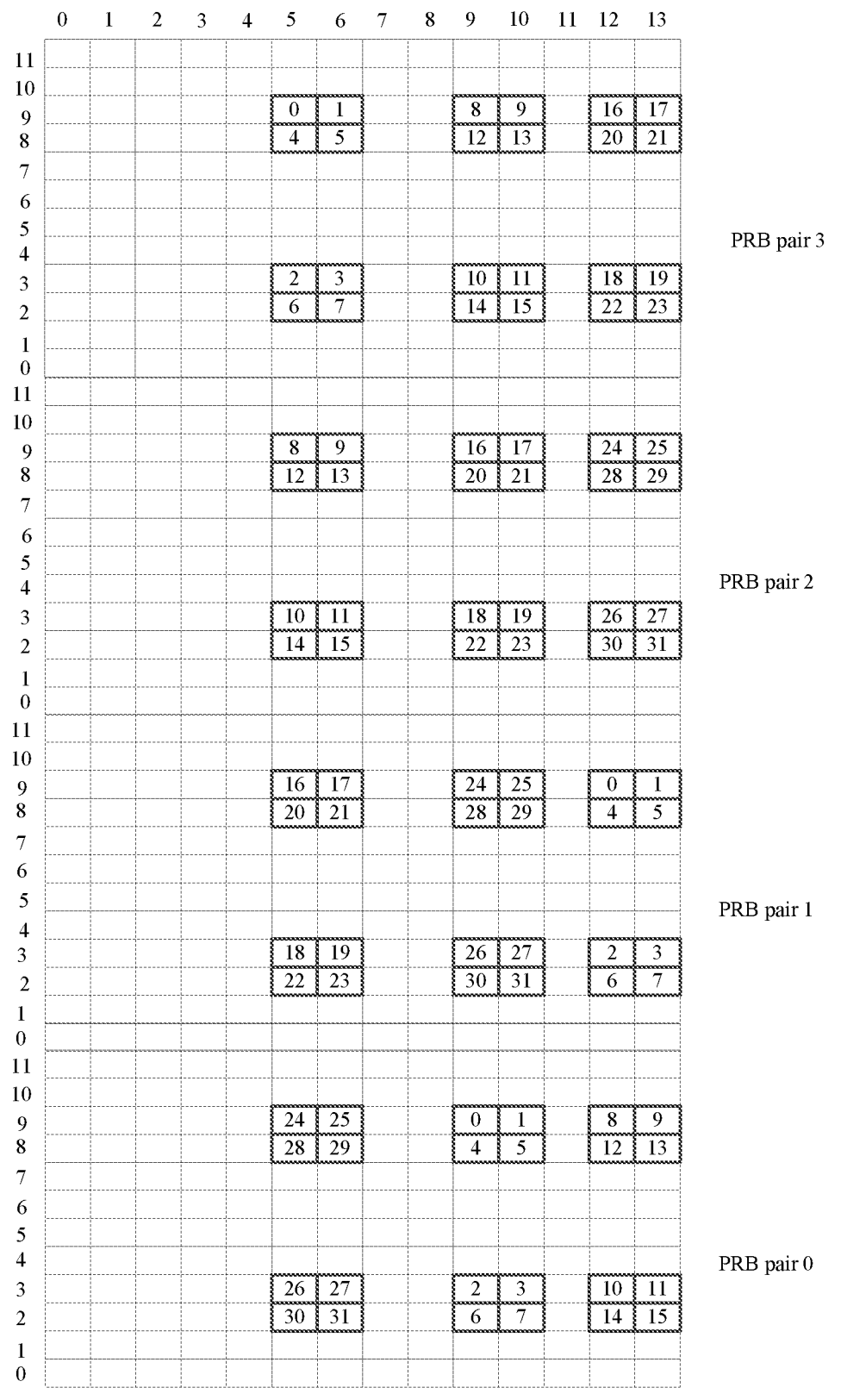

Referring to FIG. 17, CSI-RSs of 32 antenna ports are divided into four groups: a zeroth group of antenna ports 0 to 7, a first group of antenna ports 8 to 15, a second group of antenna ports 16 to 23, and a third group of antenna ports 24 to 31. Each PRB pair is used to transmit CSI-RSs of three groups of antenna ports. In this embodiment, three third resource maps corresponding to the CSI-RS configuration 0, the CSI-RS configuration 1, and the CSI-RS configuration 2 in Table 1 are used for transmission.

As shown in FIG. 17, in a PRB pair 0, CSI-RSs corresponding to the antenna ports 24 to 31 are transmitted in a third resource map corresponding to the CSI-RS configuration 0, CSI-RSs corresponding to the antenna ports 0 to 7 are transmitted in a third resource map corresponding to the CSI-RS configuration 1, and CSI-RSs corresponding to the antenna ports 8 to 15 are transmitted in a third resource map corresponding to the CSI-RS configuration 2, in other words, CSI-RSs corresponding to the third group of antenna ports, the zeroth group of antenna ports, and the first group of antenna ports are transmitted in the PRB pair 0. In a PRB pair 1, CSI-RSs corresponding to the antenna ports 16 to 23 are transmitted in a third resource map corresponding to the CSI-RS configuration 0, the CSI-RSs corresponding to the antenna ports 24 to 31 are transmitted in a third resource map corresponding to the CSI-RS configuration 1, and the CSI-RSs corresponding to the antenna ports 0 to 7 are transmitted in a third resource map corresponding to the CSI-RS configuration 2, in other words, CSI-RSs corresponding to the second group of antenna ports, the third group of antenna ports, and the zeroth group of antenna ports are transmitted in the PRB pair 1. In a PRB pair 2, the CSI-RSs corresponding to the antenna ports 8 to 15 are transmitted in a third resource map corresponding to the CSI-RS configuration 0, the CSI-RSs corresponding to the antenna ports 16 to 23 are transmitted in a third resource map corresponding to the CSI-RS configuration 1, and the CSI-RSs corresponding to the antenna ports 24 to 31 are transmitted in a third resource map corresponding to the CSI-RS configuration 2, in other words, CSI-RSs corresponding to the first group of antenna ports, the second group of antenna ports, and the third group of antenna ports are transmitted in the PRB pair 2. In a PRB pair 3, the CSI-RSs corresponding to the antenna ports 0 to 7 are transmitted in a third resource map corresponding to the CSI-RS configuration 0, the CSI-RSs corresponding to the antenna ports 8 to 15 are transmitted in a third resource map corresponding to the CSI-RS configuration 1, and the CSI-RSs corresponding to the antenna ports 16 to 23 are transmitted in a third resource map corresponding to the CSI-RS configuration 2, in other words, CSI-RSs corresponding to the zeroth group of antenna ports, the first group of antenna ports, and the second group of antenna ports are transmitted in the PRB pair 3.

It may be seen from FIG. 17 that, in CSI-RSs respectively sent in the PRB pair 0 and the PRB pair 1 that are adjacent to each other in frequency domain, there are two groups of same antenna ports (where a quantity of the antenna ports is 16) corresponding to the CSI-RSs, in other words, both the PRB pair 0 and the PRB pair 1 include the zeroth group of antenna ports and the first group of antenna ports, and there are one group of different antenna ports (where a quantity of the antenna ports is 8) corresponding to the CSI-RSs. Likewise, both the PRB pair 1 and the PRB pair 2 include the second group of antenna ports and the third group of antenna ports, and both the PRB pair 2 and the PRB pair 3 include the first group of antenna ports and the second group of antenna ports.

In addition, in the resource units shown in FIG. 17, eight antenna ports in each group have a same polarization direction.

Figure 18:
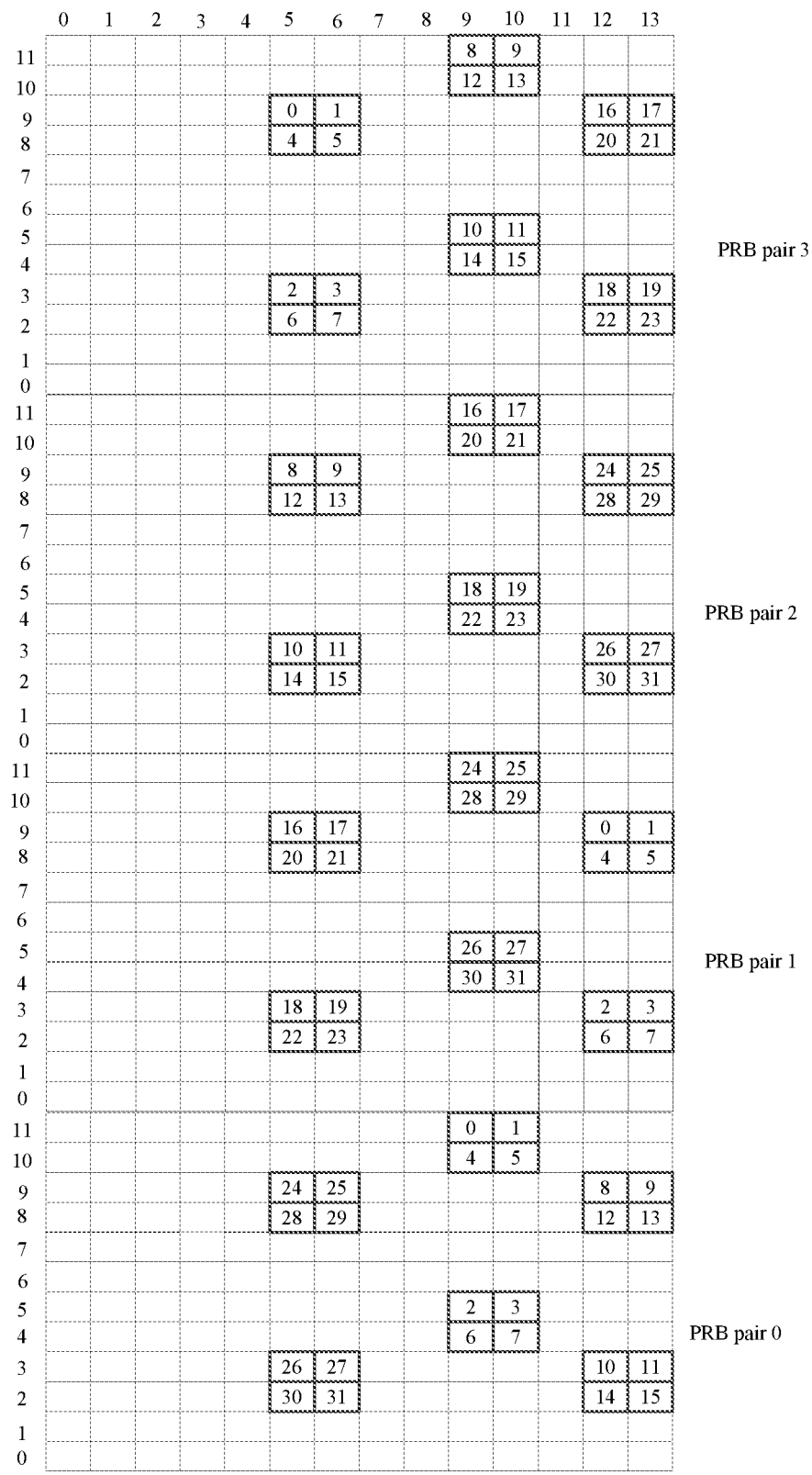
FIG. 18 is a schematic diagram of implementing a reference signal transmitting/receiving method according to an embodiment of the present disclosure.

It should be noted that, in different embodiments, three CSI-RS configurations may be randomly selected from the five CSI-RS configurations in Table 1 to perform CSI-RS transmission. In this embodiment, that time-frequency resources corresponding to the CSI-RS configurations 0, 1, and 2 are selected from the five CSI-RS configurations in Table 1 is merely an example for description. In another embodiment, time-frequency resources corresponding to CSI-RS configurations 1, 2, and 3 may be selected from the five CSI-RS configurations in Table 1, as shown in FIG. 18. Details are not described again.

It should be noted that numbers of antenna ports in FIG. 17 and FIG. 18 are merely for example description, and do not indicate a specific number of an antenna port. This is not limited in this embodiment of the present disclosure.

It should be noted that, in this embodiment of the present disclosure, an example of transmitting CSI-RSs of 32 antenna ports is used for description. Based on the foregoing content, a case of 8, 16, 20, 24, 64, or another quantity of antenna ports may be easily figured out by persons skilled in the art with reference to the foregoing embodiments. Details are not described herein.

It can be further seen from FIG. 17 that, in two adjacent PRB pairs in frequency domain, in an $i^{th}$ PRB pair and an $(i+1)^{th}$ PRB pair that are adjacent to each other in frequency domain, a $j^{th}$ third resource map in the $i^{th}$ PRB pair is corresponding to one group of antenna ports in the four groups of antenna ports, and a $j^{th}$ third resource map in the $(i+1)^{th}$ PRB pair is corresponding to another group of antenna ports in the four groups of antenna ports. Specifically, in the PRB pair 0, the antenna ports corresponding to the CSI-RSs transmitted in the third resource map corresponding to the CSI-RS configuration 0 are the third group of antenna ports, and in the PRB pair 1, the antenna ports corresponding to the CSI-RSs transmitted in the third resource map corresponding to the CSI-RS configuration 0 are the second group of antenna ports. The two groups of antenna ports are different. In the PRB pair 1, the antenna ports corresponding to the CSI-RSs transmitted in the third resource map corresponding to the CSI-RS configuration 0 are the second group of antenna ports, and in the PRB pair 2, the antenna ports corresponding to the CSI-RSs transmitted in the third resource map corresponding to the CSI-RS configuration 1 are the first group of antenna ports. The two groups of antenna ports are different. In the PRB pair 2, the antenna ports corresponding to the CSI-RSs transmitted in the third resource map corresponding to the CSI-RS configuration 0 are the first group of antenna ports, and in the PRB pair 3, the antenna ports corresponding to the CSI-RSs transmitted in the third resource map corresponding to the CSI-RS configuration 0 are the zeroth group of antenna ports. The two groups of antenna ports are different.

It can be further seen from FIG. 17 that, when the K resource units occupy the same time domain resource in the reference signal resource set, and the K resource units are consecutive in frequency domain of the reference signal resource set, a $j^{th}$ third resource map in each of the K resource units occupies a same time domain location in a single resource unit, and M $j^{th}$ third resource maps in M resource units are in a one-to-one correspondence to the M groups of antenna ports; a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $0 \le j < j+1 \le N-1$.

It should be noted that K is an integer greater than 2, M is an integer greater than or equal to 2, and i and j are integers.

For example, the third resource map corresponding to the CSI-RS configuration 0 in each of the four resource units occupy a same time domain location in a single resource unit, that is, a fifth and a sixth OFDM symbols, and the four third resource maps corresponding to the CSI-RS configuration 0 in the four resource units are in a one-to-one correspondence to the four groups of antenna ports. To be specific, the third resource map corresponding to the CSI-RS configuration 0 in the PRB pair 0 is corresponding to the third group of antenna ports, the third resource map corresponding to the CSI-RS configuration 0 in the PRB pair 1 is corresponding to the second group of antenna ports, the third resource map corresponding to the CSI-RS configuration 0 in the PRB pair 2 is corresponding to the first group of antenna ports, and the third resource map corresponding to the CSI-RS configuration 0 in the PRB pair 3 is corresponding to the zeroth group of antenna ports. Likewise, the third resource map corresponding to the CSI-RS configuration 1 in each of the four resource units occupy a same time domain location in a single resource unit, that is, a ninth and a tenth OFDM symbols, and the four third resource maps corresponding to the CSI-RS configuration 1 are in a one-to-one correspondence to the four groups of antenna ports.

The third resource map corresponding to the CSI-RS configuration 2 in each of the four resource units occupy a same time domain location in a single resource unit, that is, a twelfth and a thirteenth OFDM symbols, and the four third resource maps corresponding to the CSI-RS configuration 2 are in a one-to-one correspondence to the four groups of antenna ports. Details are not described herein.

In this embodiment, in a same time domain location, for example, in the fifth and the sixth OFDM symbols, a polling manner is used, so that corresponding CSI-RSs are transmitted on the 32 antenna ports, and transmission efficiency is improved. In the ninth and the tenth OFDM symbols, a polling manner is used, so that corresponding CSI-RSs are transmitted on the 32 antenna ports, and transmission efficiency is improved. In the twelfth and the thirteenth OFDM symbols, a polling manner is used, so that corresponding CSI-RSs are transmitted on the 32 antenna ports, and transmission efficiency is improved.

Likewise, in an embodiment similar to that shown in FIG. 10, when the K resource units occupy the same frequency domain resource in the reference signal resource set, and the K resource units are consecutive in time domain of the reference signal resource set, a $j^{th}$ third resource map in each of the K resource units occupies a same time domain location in a single resource unit, and M $j^{th}$ third resource maps in M resource units are in a one-to-one correspondence to the M groups of antenna ports; a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $0 \leq j < j+1 \leq N-1$. It should be noted that K is an integer greater than 2, M is an integer greater than or equal to 2, and i and j are integers.

In the embodiment shown in FIG. 17, the three third resource maps corresponding to the CSI-RS configuration 0, the CSI-RS configuration 1, and the CSI-RS configuration 2 are aggregated to form a second resource map. In this case, any two second resource maps occupy a same time domain location and a same frequency domain location in a time domain resource pattern corresponding to a single resource unit.

It may be seen from FIG. 17 that second resource maps of reference signals corresponding to 24 antenna ports in any two PRB pairs occupy a same time-frequency location in a time-frequency resource pattern corresponding to a single PRB pair, to be specific, the fifth, sixth, ninth, tenth, twelfth, and thirteenth OFDM symbols. In addition, the second resource maps of the reference signals corresponding to the 24 antenna ports in any two PRB pairs occupy a same frequency domain location in the time-frequency resource pattern corresponding to the single PRB pair, to be specific, a second, third, eighth, and ninth subcarriers.

In an optional embodiment different from FIG. 17, three third resource maps corresponding to the CSI-RS configuration 0, the CSI-RS configuration 1, and the CSI-RS configuration 2 are aggregated to form a second resource map, or three third resource maps corresponding to the CSI-RS configuration 0, the CSI-RS configuration 3, and the CSI-RS configuration 2 are aggregated to form a second resource map. At least two second resource maps occupy different frequency domain locations in a time domain resource pattern corresponding to a single resource unit, and/or at least two second resource maps occupy a same frequency domain location in a time-frequency resource pattern corresponding to a single resource unit.

Figure 19:
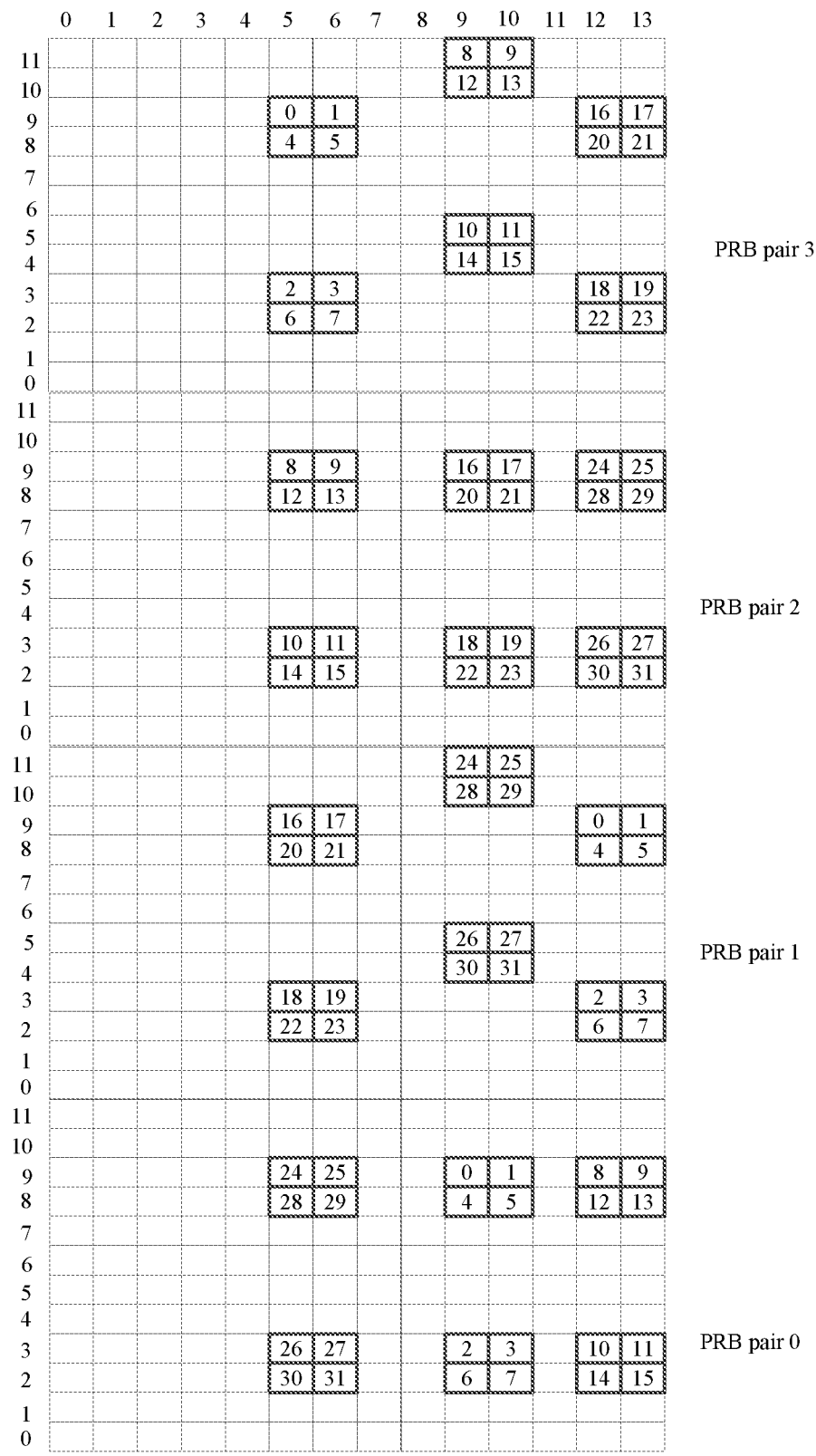
FIG. 19 is a schematic diagram of implementing a DMRS transmitting/receiving method according to an embodiment of the present disclosure.

It can be seen from FIG. 19 that a PRB pair 0 and a PRB pair 1 occupy different frequency domain locations in a time domain resource pattern corresponding to a single resource unit, the PRB pair 0 occupies a second, third, eighth, and ninth subcarriers, and the PRB pair 1 occupies a second, third, eighth, ninth, tenth, and eleventh subcarriers; and the PRB pair 0 and a PRB pair 2 occupy a same frequency domain location in a time domain resource pattern corresponding to a single resource unit, and both the PRB pair 0 and the PRB pair 2 occupy the second, third, eighth, and ninth subcarriers.

It should be noted that numbers of antenna ports in FIG. 19 are merely for example description, and do not indicate a specific number of an antenna port. This is not limited in this embodiment of the present disclosure.

The foregoing embodiment is described by using an example in which the reference signal is a CSI-RS. The reference signal transmitting/receiving method provided in the embodiments of the present disclosure may be further applied to transmitting and receiving a DMRS. Details are as follows.

Figure 20:
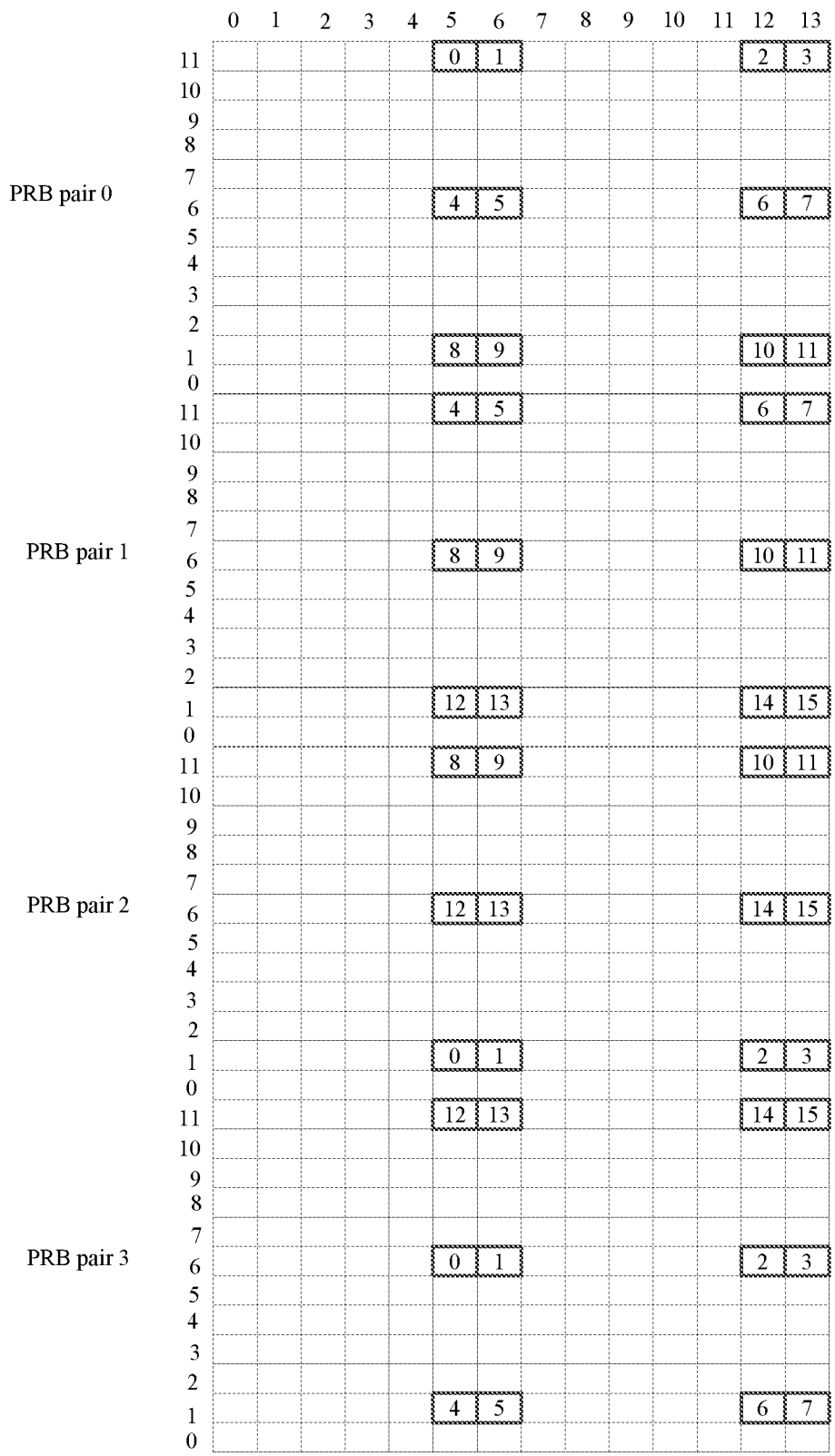
FIG. 20 is a schematic diagram of implementing a DMRS transmitting/receiving method according to another embodiment of the present disclosure.

Referring to FIG. 20, an example of transmitting 4*4=16 DMRSs is used, four resource units have a same time domain location, and are arranged at different frequency domain locations. The resource unit is a PRB pair. A transmitting device transmits DMRSs corresponding to 16 antenna ports in the four resource units. The 16 antenna ports are divided into four groups. Each group has four antenna ports. A zeroth group includes antenna ports 0 to 3, a first group includes antenna ports 4 to 7, a second group includes antenna ports 8 to 11, and a third group includes antenna ports 12 to 15. A second resource map corresponding to each resource unit includes three third resource maps that are respectively starting from (11, 5), (6, 5), and (1, 5), and each third resource map is used to transmit DMRSs corresponding to one group of antenna ports.

A third resource map starting from (11, 5) includes four REs that are located at an eleventh subcarrier and that are respectively located at a fifth, sixth, twelfth, and thirteenth OFDM symbols. A third resource map starting from (6, 5) includes four REs that are located at a sixth subcarrier and that are respectively located at the fifth, sixth, twelfth, and thirteenth OFDM symbols. A third resource map starting from (1, 5) includes four REs that are located at a first subcarrier and that are respectively located at the fifth, sixth, twelfth, and thirteenth OFDM symbols.

As shown in FIG. 20, the DMRSs are transmitted on the four PRB pairs, in a PRB pair 3, DMRSs corresponding to the antenna ports 0 to 3 are transmitted in a third resource map starting from (11, 5), DMRSs corresponding to the antenna ports 4 to 7 are transmitted in a third resource map starting from (6, 5), and DMRSs corresponding to the antenna ports 8 to 11 are transmitted in a third resource map starting from (1, 5). In a PRB pair 2, DMRSs corresponding to the antenna ports 4 to 5 are transmitted in a third resource map starting from (11, 5), DMRSs corresponding to the antenna ports 8 to 9 are transmitted in a third resource map starting from (6, 5), and DMRSs corresponding to the antenna ports 12 to 13 are transmitted in a third resource map starting from (1, 5). In a PRB pair 1, the DMRSs corresponding to the antenna ports 8 to 9 are transmitted in a third resource map starting from (11, 5), DMRSs corresponding to the antenna ports 12 to 15 are transmitted in a third resource map starting from (6, 5), and the DMRSs corresponding to the antenna ports 0 to 3 are transmitted in a third resource map starting from (1, 5). In a PRB pair 0, the DMRSs corresponding to the antenna ports 12 to 15 are transmitted in a third resource map starting from (11, 5), the DMRSs corresponding to the antenna ports 0 to 3 are transmitted in a third resource map starting from (6, 5), and the DMRSs corresponding to the antenna ports 4 to 7 are transmitted in a third resource map starting from (1, 5).

It may be seen from FIG. 20 that, in DMRSs respectively sent in the PRB pair 3 and the PRB pair 2 that are adjacent to each other in frequency domain, there are two groups of same antenna ports (where a quantity of the antenna ports is 8) corresponding to the DMRSs, in other words, both the PRB pair 3 and the PRB pair 2 include the first group of antenna ports and the second group of antenna ports, and there are one group of different antenna ports (where a quantity of the antenna ports is 4) corresponding to the DMRSs. Likewise, both the PRB pair 2 and the PRB pair 1 include the second group of antenna ports and the third group of antenna ports, and both the PRB pair 1 and the PRB pair 0 include the third group of antenna ports and the zeroth group of antenna ports.

It may be further seen from FIG. 20 that, in an $i^{th}$ PRB pair and an $(i+1)^{th}$ PRB pair that are adjacent to each other in frequency domain, a $j^{th}$ third resource map in the $i^{th}$ PRB pair is corresponding to one group of antenna ports in the four groups of antenna ports, and a $j^{th}$ third resource map in the $(i+1)^{th}$ PRB pair is corresponding to another group of antenna ports in the four groups of antenna ports. Antenna ports corresponding to the PRB pair 3 at a time-frequency resource group starting from (11, 5) are the zeroth group of antenna ports, and antenna ports corresponding to the PRB pair 2 at a time-frequency resource group starting from (11, 5) are the first group of antenna ports. The antenna ports corresponding to the PRB pair 2 at the time-frequency resource group starting from (11, 5) are the first group of antenna ports, and antenna ports corresponding to the PRB pair 1 at a time-frequency resource group starting from (11, 5) are the second group of antenna ports. The antenna ports corresponding to the PRB pair 1 at the time-frequency resource group starting from (11, 5) are the second group of antenna ports, and antenna ports corresponding to the PRB pair 0 at a time-frequency resource group starting from (11, 5) are the third group of antenna ports.

It may be seen from FIG. 20 that, on same time domain resources, for example, on the fifth and sixth OFDM symbols, the DMRSs corresponding to 16 antenna ports are transmitted in a polling manner, thereby improving transmission efficiency.

In the resource units shown in FIG. 20, four antenna ports in each group of antenna ports have a same polarization direction.

It should be noted that numbers of antenna ports in FIG. 20 are merely for example description, and do not indicate a specific number of an antenna port. This is not limited in this embodiment of the present disclosure.

It should be noted that, in this embodiment of the present disclosure, an example of transmitting 32 DMRSs is used for description. Based on the foregoing content, a case of transmitting 8, 16, 20, 24, 64, or another quantity of DMRSs may be easily figured out by persons skilled in the art with reference to the foregoing embodiments. Details are not described herein.

The reference signal transmitting/receiving method provided in the embodiments of the present disclosure may be further applied to CRS transmission. This may be easily figured out by persons skilled in the art with reference to the foregoing embodiments. Details are not described herein.

The following describes apparatus embodiments of the present disclosure. For details not described in the apparatus embodiments, refer to the foregoing method embodiments.

Figure 21:
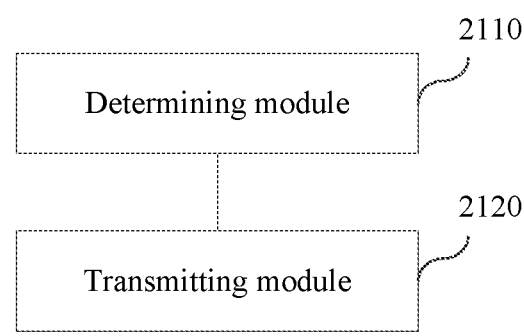
FIG. 21 is a structural block diagram of a transmitting apparatus according to an embodiment of the present disclosure.

Referring to FIG. 21, FIG. 21 shows a block diagram of a transmitting apparatus according to an embodiment of the present disclosure. The reference signal transmitting apparatus may be implemented as all or a part of a transmitting apparatus by using software, hardware, or a combination of software and hardware. The transmitting apparatus includes:

a determining unit 2110, configured to determine a first resource map of a reference signal supporting Z antenna ports, where the first resource map includes a location at which the reference signal supporting Z antenna ports is mapped to a time-frequency resource; and a transmitting unit 2120, configured to transmit the reference signal after the reference signal supporting Z antenna ports is mapped to a target time-frequency resource based on the first resource map.

The first resource map is repeated in time domain and/or frequency domain in a repetition unit of K resource units. The K resource units are K consecutive resource units in time domain or K consecutive resource units in frequency domain in a reference signal resource set. A time-frequency resource that is used to transmit the reference signal is configured for the reference signal resource set. Each of the K resource units is corresponding to a second resource map of a reference signal supporting P antenna ports. The P antenna ports corresponding to the second resource map for every two adjacent resource units include G same antenna ports and H different antenna ports, the P antenna ports are a subset of the Z antenna ports corresponding to the first resource map, and P<Z.

It should be noted that Z is an integer greater than or equal to 4, K is an integer greater than 2, P is an integer greater than 2, H is an integer greater than 2, and G is an integer greater than 2.

In conclusion, according to the reference signal transmitting apparatus provided in this embodiment of the present disclosure, a transmitting device determines the first resource map of the reference signal supporting Z antenna ports, and transmits the reference signal after the reference signal supporting Z antenna ports is mapped to the target time-frequency resource based on the first resource map. Because the first resource map is repeated in time domain and/or frequency domain in the repetition unit of K resource units, each of the K resource units is corresponding to the second resource map of the reference signal supporting P antenna ports, and the P antenna ports corresponding to the second resource map for every two adjacent resource units include G same antenna ports and H different antenna ports, partial repetition of antenna ports in different resource units helps reduce a quantity of time-frequency resources occupied by reference signals in each resource unit and ensure a transmission density of the reference signals.

Optionally, the Z antenna ports include M groups of antenna ports, each group includes Y antenna ports, and Z=M*Y; and the second resource map is obtained by aggregating N third resource maps, each third resource map is corresponding to one group of antenna ports in the M groups of antenna ports, P=N*Y, G=A*Y, H=B*Y, and A+B=N, where Y is a power of 2.

Optionally, any two second resource maps in the K resource units occupy a same time domain location in a time-frequency resource pattern corresponding to a single resource unit; and at least two second resource maps in the K resource units occupy different frequency domain locations in a time-frequency resource pattern corresponding to a single resource unit, and/or at least two second resource maps in the K resource units occupy a same frequency domain location in a time-frequency resource pattern corresponding to a single resource unit.

Optionally, in the K resource units, a $j^{th}$ third resource map in an $i^{th}$ resource unit and a $j^{th}$ third resource map in an $(i+1)^{th}$ resource unit occupy a same time domain location in a time-frequency resource pattern corresponding to a single resource unit; and the $j^{th}$ third resource map in the $i^{th}$ resource unit is corresponding to one group of antenna ports in the M groups of antenna ports, and the $j^{th}$ third resource map in the $(i+1)^{th}$ resource unit is corresponding to another group of antenna ports in the M groups of antenna ports, where $0 \leq i \leq K-1$ and $0 \leq j \leq N-1$.

Optionally, the K resource units occupy a same time domain resource in the reference signal resource set, and the K resource units are consecutive in frequency domain of the reference signal resource set; and a $j^{th}$ third resource map in each of the K resource units occupies a same time domain location in a single resource unit, and M $j^{th}$ third resource maps in M resource units are in a one-to-one correspondence to the M groups of antenna ports; a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $0 \leq j < j+1 \leq N-1$.

Optionally, the K resource units occupy a same frequency domain resource in the reference signal resource set, and the K resource units are consecutive in time domain of the reference signal resource set; and a $j^{th}$ third resource map in each of the K resource units occupies a same time domain location in a single resource unit, and $j^{th}$ third resource maps in M resource units are in a one-to-one correspondence to the M groups of antenna ports; a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $0 \leq j < j+1 \leq N-1$.

Optionally, the K resource units occupy a same frequency domain resource in the reference signal resource set, and the K resource units are consecutive in time domain of the reference signal resource set.

Optionally, the K resource units occupy a same time domain resource in the reference signal resource set, and the K resource units are consecutive in frequency domain of the reference signal resource set.

Optionally, the resource unit is a PRB, or the resource unit is a PRB pair.

Optionally, the reference signal is a DMRS, a CSI-RS, or a CRS.

Optionally, numbers of antenna ports in each of the M groups are consecutive, and a number $p^{(m)}$ of an antenna port in an $m^{th}$ group is:

$$p^{(m)} = [m*Y+\alpha, (m+1)*Y-1+\alpha]; \text{ where}$$

$0 \leq m \leq M-1$, and $\alpha$ is a predetermined offset.

Optionally, some of numbers of antenna ports in each of the M groups are consecutive, and a number $p^{(m)}$ of an antenna port in an $m^{th}$ group is:

$$p^{(m)} = \begin{cases} p' + \frac{Y}{2}m + \alpha, & p' = 0, 1, 2, \ldots, \frac{Y}{2}-1; \\ p' + \frac{Y}{2}(m+M-1) + \alpha, & p' = \frac{Y}{2}, \frac{Y}{2}+1, \frac{Y}{2}+2, \ldots, Y-1; \end{cases}$$

where $0 \leq m \leq M-1$, and $\alpha$ is a predetermined offset.

Optionally, the N third resource maps in each resource unit occupy three pairs, two pairs, or one pair of OFDM symbols.

Optionally, the reference signal is a CSI-RS, the resource unit is a PRB pair, Y=8, and N=3;

the three third resource maps in each resource unit occupy time-frequency resources indicated by a CSI-RS configuration 0, a CSI-RS configuration 1, and a CSI-RS configuration 2 in five CSI-RS configurations; or the three third resource maps in each resource unit occupy time-frequency resources indicated by a CSI-RS configuration 0, a CSI-RS configuration 2, and a CSI-RS configuration 3 in five CSI-RS configurations; or the three third resource maps in each resource unit occupy time-frequency resources indicated by a CSI-RS configuration 0, a CSI-RS configuration 2, and a CSI-RS configuration 4 in five CSI-RS configurations; or the three third resource maps in each resource unit occupy time-frequency resources indicated by a CSI-RS configuration 1, a CSI-RS configuration 3, and a CSI-RS configuration 4 in five CSI-RS configurations; and the five CSI-RS configurations include:

a time-frequency resource indicated by the CSI-RS configuration 0 includes eight resource elements REs: (k, l)=(9, 5), (9, 6), (8, 5), (8, 6), (3, 5), (3, 6), (2, 5), (2, 6);

a time-frequency resource indicated by the CSI-RS configuration 1 includes eight resource elements REs: (k, l)=(9, 9), (9, 10), (8, 9), (8, 10), (3, 9), (3, 10), (2, 9), (2, 10);

a time-frequency resource indicated by the CSI-RS configuration 2 includes eight resource elements REs: (k, l)=(9, 12), (9, 13), (8, 12), (8, 13), (3, 12), (3, 13), (2, 12), (2, 13);

a time-frequency resource indicated by the CSI-RS configuration 3 includes eight resource elements REs: (k, l)= (11, 9), (11, 10), (10, 9), (10, 10), (5, 9), (5, 10), (4, 9), (4, 10); and a time-frequency resource indicated by the CSI-RS configuration 4 includes eight resource elements REs: (k, l)=(7, 9), (7, 10), (6, 9), (6, 10), (1, 9), (1, 10), (0, 9), (0, 10), where k is a subcarrier number in the PRB pair, and l is an OFDM symbol number in the PRB pair.

Optionally, spectrum spreading is performed, by using spreading code of OCC=8, on eight CSI-RSs corresponding to each third resource map.

Optionally, N groups of antenna ports corresponding to a second resource map of a $k^{th}$ resource unit are a ((k mod M)+$\beta$)$^{th}$ group of antenna ports, a (((k+1) mod M)+$\beta$)$^{th}$ group of antenna ports, . . . , and a (((k+N-1) mod M)+$\beta$)$^{th}$ group of antenna ports in the M groups of antenna ports, where $0 \leq k \leq K-1$, and $\beta$ is a predetermined offset.

Optionally, when Z=20, M=10, Y=2, and 1<N<10, or M=5, Y=4, and 1<N<5; or when Z=24, M=12, Y=2, and 1<N<12, or M=6, Y=4, and 1<N<6, or M=3, Y=8, and 1<N<3; or when Z=28, M=14, Y=2, and 1<N<14, or M=7, Y=4, and 1<N<7; or when Z=32, M=16, Y=2, and 1<N<16, or M=8, Y=4, and 1<N<8, or M=4, Y=8, and 1<N<4.

Optionally, Y is an integer less than or equal to 8.

It should be noted that Z is an integer greater than or equal to 4, K is an integer greater than 2, M is an integer greater than or equal to 2, N is an integer greater than or equal to 2, P is an integer greater than 2, H is an integer greater than 2, G is an integer greater than 2, A is an integer greater than or equal to 1, B is an integer greater than or equal to 1, i and j are integers, and k is an integer greater than or equal to 0.

Figure 22:
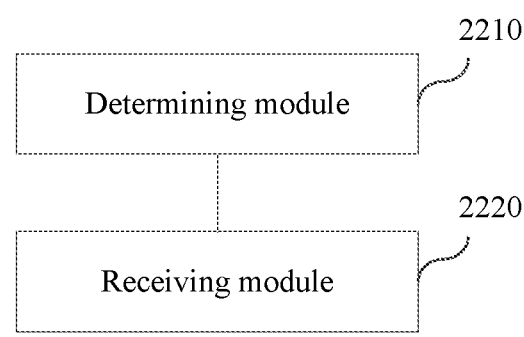
FIG. 22 is a structural block diagram of a receiving apparatus according to another embodiment of the present disclosure.

Referring to FIG. 22, FIG. 22 shows a block diagram of a receiving apparatus according to an embodiment of the present disclosure. The reference signal transmitting apparatus may be implemented as all or a part of a transmitting apparatus by using software, hardware, or a combination of software and hardware. The transmitting apparatus includes:

a determining unit 2110, configured to determine a first resource map of a reference signal supporting Z antenna ports, where the first resource map includes a location at which the reference signal supporting Z antenna ports is mapped to a time-frequency resource; and a receiving unit 2120, configured to receive, based on the first resource map, the reference signal supporting Z antenna ports from a target time-frequency resource.

The first resource map is repeated in time domain and/or frequency domain in a repetition unit of K resource units. The K resource units are K consecutive resource units in time domain or K consecutive resource units in frequency domain in a reference signal resource set. A time-frequency resource that is used to transmit the reference signal is configured for the reference signal resource set. Each of the K resource units is corresponding to a second resource map of a reference signal supporting P antenna ports. The P antenna ports corresponding to the second resource map for every two adjacent resource units include G same antenna ports and H different antenna ports, the P antenna ports are a subset of the Z antenna ports corresponding to the first resource map, and P<Z.

In conclusion, according to the reference signal receiving apparatus provided in this embodiment of the present disclosure, a receiving device receives, based on the first resource map, the reference signal supporting Z antenna ports from the target time-frequency resource. Because the first resource map is repeated in time domain and/or frequency domain in the repetition unit of K resource units, each of the K resource units is corresponding to the second resource map of the reference signal supporting P antenna ports, and the P antenna ports corresponding to the second resource map for every two adjacent resource units include G same antenna ports and H different antenna ports, partial repetition of antenna ports in different resource units helps reduce a quantity of time-frequency resources occupied by reference signals in each resource unit and ensure a transmission density of the reference signals.

Optionally, the Z antenna ports include M groups of antenna ports, each group includes Y antenna ports, and Z=M*Y; and the second resource map is obtained by aggregating N third resource maps, each third resource map is corresponding to one group of antenna ports in the M groups of antenna ports, P=N*Y, G=A*Y, H=B*Y, and A+B=N, where Y is a power of 2.

Optionally, any two second resource maps in the K resource units occupy a same time domain location in a time-frequency resource pattern corresponding to a single resource unit; and at least two second resource maps in the K resource units occupy different frequency domain locations in a time-frequency resource pattern corresponding to a single resource unit, and/or at least two second resource maps in the K resource units occupy a same frequency domain location in a time-frequency resource pattern corresponding to a single resource unit.

Optionally, in the K resource units, a $j^{th}$ third resource map in an $i^{th}$ resource unit and a $j^{th}$ third resource map in an $(i+1)^{th}$ resource unit occupy a same time domain location in a time-frequency resource pattern corresponding to a single resource unit; and the $j^{th}$ third resource map in the $i^{th}$ resource unit is corresponding to one group of antenna ports in the M groups of antenna ports, and the $j^{th}$ third resource map in the $(i+1)^{th}$ resource unit is corresponding to another group of antenna ports in the M groups of antenna ports, where $0 \le i \le K-1$ and $0 \le j \le N-1$.

Optionally, the K resource units occupy a same time domain resource in the reference signal resource set, and the K resource units are consecutive in frequency domain of the reference signal resource set;

a $j^{th}$ third resource map in each of the K resource units occupies a same time domain location in a single resource unit, and M $j^{th}$ third resource maps in M resource units are in a one-to-one correspondence to the M groups of antenna ports;

a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $$0 \le j < j+1 \le N-1.$$

Optionally, the K resource units occupy a same frequency domain resource in the reference signal resource set, and the K resource units are consecutive in time domain of the target time-frequency resource;

a $j^{th}$ third resource map in each of the K resource units occupies a same time domain location in a single resource unit, and $j^{th}$ third resource maps in M resource units are in a one-to-one correspondence to the M groups of antenna ports;

a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and a $j^{th}$ third resource map and a $(j+1)^{th}$ third resource map in a same resource unit are corresponding to different antenna ports, where $$0 \le j < j+1 \le N-1.$$

Optionally, the K resource units occupy a same frequency domain resource in the reference signal resource set, and the K resource units are consecutive in time domain of the reference signal resource set.

Optionally, the K resource units occupy a same frequency domain time domain resource in the reference signal resource set, and the K resource units are consecutive in time domain frequency domain of the reference signal resource set.

Optionally, the resource unit is a PRB, or the resource unit is a PRB pair.

Optionally, the reference signal is a DMRS, a CSI-RS, or a CRS.

Optionally, numbers of antenna ports in each of the M groups are consecutive, and a number $p^{(m)}$ of an antenna port in an $m^{th}$ group is:

$$p^{(m)}=[m*Y+\alpha, (m+1)*Y-1+\alpha];\text{ where}$$

$0 \le m \le M-1$, and $\alpha$ is a predetermined offset.

Optionally, some of numbers of antenna ports in each of the M groups are consecutive, and a number $p^{(m)}$ of an antenna port in an $m^{th}$ group is:

$$p^{(m)} = \begin{cases} p' + \frac{Y}{2}m + \alpha, p' = 0, 1, 2, \ldots, \frac{Y}{2}-1 \\ p' + \frac{Y}{2}(m+M-1) + \alpha, p' = \frac{Y}{2}, \frac{Y}{2}+1, \frac{Y}{2}+1, \ldots, Y-1 \end{cases};$$

where $0 \le m \le M-1$, and $\alpha$ is a predetermined offset.

Optionally, the N third resource maps in each resource unit occupy three pairs, two pairs, or one pair of orthogonal frequency division multiplexing OFDM symbols.

Optionally, the reference signal is a CSI-RS, the resource unit is a PRB pair, Y=8, and N=3;

the N third resource maps in each resource unit occupy time-frequency resources indicated by a CSI-RS configuration 0, a CSI-RS configuration 1, and a CSI-RS configuration 2 in five CSI-RS configurations; or the three third resource maps in each resource unit occupy time-frequency resources indicated by a CSI-RS configuration 0, a CSI-RS configuration 2, and a CSI-RS configuration 3 in five CSI-RS configurations; or the three third resource maps in each resource unit occupy time-frequency resources indicated by a CSI-RS configuration 0, a CSI-RS configuration 2, and a CSI-RS configuration 4 in five CSI-RS configurations; or the three third resource maps in each resource unit occupy time-frequency resources indicated by a CSI-RS configuration 1, a CSI-RS configuration 3, and a CSI-RS configuration 4 in five CSI-RS configurations; and the five CSI-RS configurations include:

a time-frequency resource indicated by the CSI-RS configuration 0 includes eight resource elements REs: (k, l)=(9, 5), (9, 6), (8, 5), (8, 6), (3, 5), (3, 6), (2, 5), (2, 6);

a time-frequency resource indicated by the CSI-RS configuration 1 includes eight resource elements REs: (k, l)=(9, 9), (9, 10), (8, 9), (8, 10), (3, 9), (3, 10), (2, 9), (2, 10);

a time-frequency resource indicated by the CSI-RS configuration 2 includes eight resource elements REs: (k, l)=(9, 12), (9, 13), (8, 12), (8, 13), (3, 12), (3, 13), (2, 12), (2, 13);

a time-frequency resource indicated by the CSI-RS configuration 3 includes eight resource elements REs: (k, l)= (11, 9), (11, 10), (10, 9), (10, 10), (5, 9), (5, 10), (4, 9), (4, 10); and a time-frequency resource indicated by the CSI-RS configuration 4 includes eight resource elements REs: (k, l)=(7, 9), (7, 10), (6, 9), (6, 10), (1, 9), (1, 10), (0, 9), (0, 10), where k is a subcarrier number in the PRB pair, and l is an OFDM symbol number in the PRB pair.

Optionally, spectrum spreading is performed, by using spreading code of OCC=8, on eight CSI-RSs corresponding to each third resource map.

Optionally, N groups of antenna ports corresponding to a second resource map of a $k^{th}$ resource unit are a $((k \bmod M)+\beta)^{th}$ group of antenna ports, a $(((k+1) \bmod M)+\beta)^{th}$ group of antenna ports, ..., and a $(((k+N-1) \bmod M)+\beta)^{th}$ group of antenna ports in the M groups of antenna ports, where $0 \le k \le K-1$, and $\beta$ is a predetermined offset.

It should be noted that Z is an integer greater than or equal to 4, K is an integer greater than 2, M is an integer greater than or equal to 2, N is an integer greater than or equal to 2, P is an integer greater than 2, H is an integer greater than 2, G is an integer greater than 2, A is an integer greater than or equal to 1, B is an integer greater than or equal to 1, i and j are integers, and k is an integer greater than or equal to 0.

Persons of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A receiving device, comprising:
a receiver; and
at least one processor coupled to the receiver, the at least one processor configured to:
  determine a first resource map of a reference signal supporting Z antenna ports, wherein the first resource map comprises a location at which the reference signal supporting Z antenna ports is mapped to a time-frequency resource, and wherein Z is an integer greater than or equal to 4; and
  receive, based on the first resource map by using the receiver, the reference signal supporting Z antenna ports from a target time-frequency resource, wherein:
  the first resource map is repeated in a time domain and/or a frequency domain in a repetition unit of K resource units, the K resource units are K consecutive resource units in a time domain or K consecutive resource units in a frequency domain in a reference signal resource set, a time-frequency resource that is used to transmit the reference signal is configured for the reference signal resource set, each of the K resource units corresponds to a second resource map of a reference signal supporting P antenna ports, the P antenna ports corresponding to the second resource map for every two adjacent resource units comprise G same antenna ports and H different antenna ports, the P antenna ports are a subset of the Z antenna ports corresponding to the first resource map, K, P, G, and H are integers greater than 2, and P<Z.

2. The receiving device according to claim 1, wherein:
the Z antenna ports comprise M groups of antenna ports, each group comprises Y antenna ports, and Z=M*Y; and
the second resource map is obtained by aggregating N third resource maps, each third resource map corresponds to one group of antenna ports in the M groups of antenna ports, P=N*Y, G=A*Y, H=B*Y, and A+B=N, wherein M and N are integers greater than or equal to 2, A and B are integers greater than or equal to 1, and Y is a power of 2.

3. The receiving device according to claim 1, wherein:
any two second resource maps in the K resource units occupy a same time domain location in a time-frequency resource pattern corresponding to a single resource unit; and
at least two second resource maps in the K resource units occupy different frequency domain locations in a time-frequency resource pattern corresponding to a single resource unit, and/or at least two second resource maps in the K resource units occupy a same frequency domain location in a time-frequency resource pattern corresponding to a single resource unit.

4. The receiving device according to claim 1, wherein in the K resource units:
a $j^{th}$ third resource map in an $i^{th}$ resource unit and a $j^{th}$ third resource map in an $(i+1)^{th}$ resource unit occupy a same time domain location in a time-frequency resource pattern corresponding to a single resource unit; and
the $j^{th}$ third resource map in the $i^{th}$ resource unit is corresponding to one group of antenna ports in M groups of antenna ports, and the $j^{th}$ third resource map in the $(i+1)^{th}$ resource unit is corresponding to another group of antenna ports in the M groups of antenna ports, wherein $0 \leq i \leq K-1$ and $0 \leq j \leq N-1$, i and j are integers, and M and N are integers greater than or equal to 2.

5. The receiving device according to claim 1, wherein:
the K resource units occupy a same time domain resource in the reference signal resource set, and the K resource units are consecutive in frequency domain of the reference signal resource set;
a $j^{th}$ third resource map in each of the K resource units occupies a same time domain location in a single resource unit, and M $j^{th}$ third resource maps in M resource units are in a one-to-one correspondence to M groups of antenna ports;
a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and
a $j^{th}$ third resource map and a $(j+1)^{th}$ third resource map in a same resource unit are corresponding to different antenna ports, wherein $0 \leq j < j+1 \leq N-1$, i and j are integers, and M and N are integers greater than or equal to 2.

6. The receiving device according to claim 1, wherein:
the K resource units occupy a same frequency domain resource in the reference signal resource set, and the K resource units are consecutive in the time domain of the reference signal resource set;
a $j^{th}$ third resource map in each of the K resource units occupies a same time domain location in a single resource unit, and $j^{th}$ third resource maps in M resource units are in a one-to-one correspondence to M groups of antenna ports;
a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and
a $j^{th}$ third resource map and a $(j+1)^{th}$ third resource map in a same resource unit are corresponding to different antenna ports, wherein $0 \leq j < j+1 \leq N-1$, i and j are integers, and M and N are integers greater than or equal to 2.

7. The receiving device according to claim 1, wherein:
the K resource units occupy a same frequency domain resource in the reference signal resource set; and
the K resource units are consecutive in the time domain of the reference signal resource set.

8. The receiving device according to claim 1, wherein:
the K resource units occupy a same time domain resource in the reference signal resource set; and
the K resource units are consecutive in the frequency domain of the reference signal resource set.

9. The receiving device according to claim 1, wherein:
the resource unit is a physical resource block (PRB); or
the resource unit is a PRB pair.

10. The receiving device according to claim 1, wherein the reference signal is a demodulation reference signal (DMRS), a channel state information-reference signal (CSI-RS), or a cell-specific reference signal (CRS).

11. A reference signal receiving method, the method comprising:
determining, by a receiving device, a first resource map of a reference signal supporting Z antenna ports, wherein the first resource map comprises a location at which the reference signal supporting Z antenna ports is mapped to a time-frequency resource, and wherein Z is an integer greater than or equal to 4; and
receiving, by the receiving device based on the first resource map, the reference signal supporting Z antenna ports from a target time-frequency resource, wherein:
the first resource map is repeated in a time domain and/or a frequency domain in a repetition unit of K resource units, the K resource units are K consecutive resource units in a time domain or K consecutive resource units in a frequency domain in a reference signal resource set, a time-frequency resource that is used to transmit the reference signal is configured for the reference signal resource set, each of the K resource units corresponds to a second resource map of a reference signal supporting P antenna ports, the P antenna ports corresponding to the second resource map for every two adjacent resource units comprise G same antenna ports and H different antenna ports, the P antenna ports are a subset of the Z antenna ports corresponding to the first resource map, K, P, G, and H are integers greater than 2, and P<Z.

12. The method according to claim 11, wherein:
the Z antenna ports comprise M groups of antenna ports, each group comprises Y antenna ports, and Z=M*Y; and
the second resource map is obtained by aggregating N third resource maps, each third resource map is corresponding to one group of antenna ports in the M groups of antenna ports, P=N*Y, G=A*Y, H=B*Y, and A+B=N, wherein M and N are integers greater than or equal to 2, A and B are integers greater than or equal to 1, and Y is a power of 2.

13. The method according to claim 11, wherein:
any two second resource maps in the K resource units occupy a same time domain location in a time-frequency resource pattern corresponding to a single resource unit; and
at least two second resource maps in the K resource units occupy different frequency domain locations in a time-frequency resource pattern corresponding to a single resource unit, and/or at least two second resource maps in the K resource units occupy a same frequency domain location in a time-frequency resource pattern corresponding to a single resource unit.

14. The method according to claim 11, wherein in the K resource units:
a $j^{th}$ third resource map in an $i^{th}$ resource unit and a $j^{th}$ third resource map in an $(i+1)^{th}$ resource unit occupy a same time domain location in a time-frequency resource pattern corresponding to a single resource unit; and
the $j^{th}$ third resource map in the $i^{th}$ resource unit is corresponding to one group of antenna ports in M groups of antenna ports, and the $j^{th}$ third resource map in the $(i+1)^{th}$ resource unit is corresponding to another group of antenna ports in the M groups of antenna ports, wherein $0 \le i \le K-1$ and $0 \le j \le N-1$, i and j are integers, and M and N are integers greater than or equal to 2.

15. The method according to claim 11, wherein:
the K resource units occupy a same time domain resource in the reference signal resource set, and the K resource units are consecutive in the frequency domain of the reference signal resource set;
a $j^{th}$ third resource map in each of the K resource units occupies a same time domain location in a single resource unit, and M $j^{th}$ third resource maps in M resource units are in a one-to-one correspondence to M groups of antenna ports;
a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and
a $j^{th}$ third resource map and a $(j+1)^{th}$ third resource map in a same resource unit are corresponding to different antenna ports, wherein $0 \le j < j+1 < N-1$, i and j are integers, and M and N are integers greater than or equal to 2.

16. The method according to claim 11, wherein:
the K resource units occupy a same frequency domain resource in the reference signal resource set, and the K resource units are consecutive in the time domain of the reference signal resource set;
a $j^{th}$ third resource map in each of the K resource units occupies a same time domain location in a single resource unit, and $j^{th}$ third resource maps in M resource units are in a one-to-one correspondence to M groups of antenna ports;
a $(j+1)^{th}$ third resource map in each of the K resource units occupies a same time domain location in a single resource unit, and M $(j+1)^{th}$ third resource maps in the M resource units are in a one-to-one correspondence to the M groups of antenna ports; and
a $j^{th}$ third resource map and a $(j+1)^{th}$ third resource map in a same resource unit are corresponding to different antenna ports, wherein $0 \le j < j+1 < N-1$, i and j are integers, and M and N are integers greater than or equal to 2.

17. The method according to claim 11, wherein:
the K resource units occupy a same frequency domain resource in the reference signal resource set; and
the K resource units are consecutive in the time domain of the reference signal resource set.

18. The method according to claim 11, wherein:
the K resource units occupy a same frequency domain time domain resource in the reference signal resource set; and
the K resource units are consecutive in a time domain frequency domain of the reference signal resource set.

19. The method according to claim 11, wherein the resource unit is a physical resource block (PRB), or the resource unit is a PRB pair.

20. The method according to claim 11, wherein the reference signal is a demodulation reference signal (DMRS), a channel state information-reference signal (CSI-RS), or a cell-specific reference signal (CRS).

* * * * *

UNITED STATES PATENT AND TRADEMARK OFFICE
CERTIFICATE OF CORRECTION

PATENT NO. : 10,785,002 B2
APPLICATION NO. : 16/146013
DATED : September 22, 2020
INVENTOR(S) : Kunpeng Liu Page 1 of 1

It is certified that error appears in the above-identified patent and that said Letters Patent is hereby corrected as shown below:

In the Claims

In Column 37, Line 36, in Claim 15, delete "$0 \leq j < j+1 < N-1$," and insert -- $0 \leq j < j+1 \leq N-1$, --, therefor.

In Column 38, Line 17, in Claim 16, delete "$0 \leq j < j+1 < N-1$," and insert -- $0 \leq j < j+1 \leq N-1$, --, therefor.

Signed and Sealed this
Sixth Day of April, 2021

Drew Hirshfeld
*Performing the Functions and Duties of the
Under Secretary of Commerce for Intellectual Property and
Director of the United States Patent and Trademark Office*